United States Patent
Centonza et al.

(10) Patent No.: US 10,085,188 B2
(45) Date of Patent: Sep. 25, 2018

(54) HANDOVER REQUEST INDICATING SPLIT OF A RADIO BEARER BETWEEN CELLS

(71) Applicant: Telefonaktiebolaget L M Ericsson (publ), Stockholm (SE)

(72) Inventors: Angelo Centonza, Winchester (GB); Mattias Bergström, Stockholm (SE); Oumer Teyeb, Solna (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 157 days.

(21) Appl. No.: 14/781,864

(22) PCT Filed: Jan. 22, 2014

(86) PCT No.: PCT/SE2014/050065
§ 371 (c)(1),
(2) Date: Oct. 1, 2015

(87) PCT Pub. No.: WO2014/163550
PCT Pub. Date: Oct. 9, 2014

(65) Prior Publication Data
US 2016/0037406 A1    Feb. 4, 2016

Related U.S. Application Data

(60) Provisional application No. 61/808,947, filed on Apr. 5, 2013.

(51) Int. Cl.
*H04W 36/08* (2009.01)
*H04W 36/04* (2009.01)
(Continued)

(52) U.S. Cl.
CPC .......... *H04W 36/08* (2013.01); *H04B 17/345* (2015.01); *H04W 36/04* (2013.01);
(Continued)

(58) Field of Classification Search
CPC ... H04W 36/08; H04W 36/04; H04W 76/025; H04W 76/15; H04W 84/045; H04W 36/20; H04B 17/345
See application file for complete search history.

(56) References Cited

U.S. PATENT DOCUMENTS

| | | | |
|---|---|---|---|
| 2010/0172291 A1* | 7/2010 | Kim | H04W 48/20 370/328 |
| 2013/0156008 A1* | 6/2013 | Dinan | H04B 7/0456 370/332 |

(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.5.0, Mar. 2013, 1-209.

(Continued)

*Primary Examiner* — Jackie Zuniga Abad
(74) *Attorney, Agent, or Firm* — Murphy, Bilak & Homiller, PLLC

(57) ABSTRACT

A method in a first network node for splitting of a DL part and an UL part of a radio bearer between a first cell and a second cell in a wireless communications network. The radio bearer is associated to DL and UL transmissions between the first network node and a user equipment in the first cell. The first network node transmits (1904) a handover request. The handover request indicates splitting of the DL part and the UL part of the radio bearer between the first cell and the second cell. The first network node receives (1905) a handover request acknowledge of the handover request. The handover request acknowledge indicates admission of the splitting.

22 Claims, 24 Drawing Sheets

(51) Int. Cl.
  *H04B 17/345* (2015.01)
  *H04W 76/15* (2018.01)
  *H04W 36/20* (2009.01)
  *H04W 84/04* (2009.01)

(52) U.S. Cl.
  CPC ............ *H04W 76/15* (2018.02); *H04W 36/20* (2013.01); *H04W 84/045* (2013.01)

(56) References Cited

U.S. PATENT DOCUMENTS

2013/0176988 A1* 7/2013 Wang .................... H04W 28/08
                                                                370/331
2013/0183971 A1* 7/2013 Tamaki ............. H04W 36/0061
                                                                455/436

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.0.0, Jun. 2015, 1-254.

3GPP, "3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.3.0, Mar. 2013, 1-274.

3GPP, "3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.4.0, Mar. 2013, 1-143.

3GPP, "3rd Generation Partnership Project; Technical Specification Group Radio Access Network; Evolved Universal Terrestrial Radio Access Network (E-UTRAN); X2 application protocol (X2AP) (Release 13)", 3GPP TS 36.423 V13.0.0, Jun. 2015, 1-207.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.0.0, Mar. 2013, 1-290.

3GPP, "Technical Specification Group Radio Access Network; Evolved Universal Terrestrial Radio Access (E-UTRA); Radio Resource Control (RRC); Protocol specification (Release 11)", 3GPP TS 36.331 V11.3.0, Mar. 2013, 1-344.

Unknown, Author, "Discussion about dual connectivity", Renesas Mobile Europe, 3GPP TSG.RAN WG2 Meeting #81, R2-130657, Malta, Jan. 28-Feb. 1, 2013, 1-6.

Unknown, Author, "Protocol architecture alternatives for dual connectivity", Ericsson,ST-Ericsson, 3GPPTSG-RAN WG2 #81, Tdoc R2-130420, Malta, Jan. 28-Feb. 1, 2013, 1-10.

Unknown, Author, "Small cell challenges and benefits of dual connectivity", Ericsson, ST-Ericsson, 3GPP TSG-RAN WG2 #81, Tdoc R2-130416, Malta, Jan. 28-Feb. 1, 2013, 1-8.

* cited by examiner

Fig. 20 First network node 111

Fig. 22 Second network node 112

HANDOVER REQUEST INDICATING SPLIT OF A RADIO BEARER BETWEEN CELLS

TECHNICAL FIELD

Embodiments herein relate to a first network node, a second network node, a core network node and methods therein.

In particular, embodiments herein relate to splitting of downlink and uplink parts of a radio bearer for uplink and downlink transmissions.

BACKGROUND

Communication devices such as User Equipments (UE) are also known as e.g. mobile terminals, wireless terminals and/or mobile stations. User equipments are enabled to communicate wirelessly in a communications network, sometimes also referred to as a wireless communication system, a cellular communications network, a cellular radio system or a cellular network. The communication may be performed e.g. between two user equipments, between a user equipment and a regular telephone and/or between a user equipment and a server via a Radio Access Network (RAN) and possibly one or more Core Networks (CN), comprised within the cellular communications network.

User equipments may further be referred to as mobile telephones, cellular telephones, laptops, or surf plates with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another user equipment or a server.

The communications network covers a geographical area which is divided into cell areas, wherein each cell area is served by a base station, e.g. a Radio Base Station (RBS), which sometimes may be referred to as e.g. "eNB", "eNodeB", "NodeB" or "B node" depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations. In the context of this disclosure, the expression Downlink (DL) is used for the transmission path from the base station to the user equipment. The expression Uplink (UL) is used for the transmission path in the opposite direction i.e. from the user equipment to the base station.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller may supervise and coordinate various activities of the plural base stations connected thereto.

3GPP LTE radio access standard has been written in order to support high bitrates and low latency both for uplink and downlink traffic. All data transmission is in LTE is controlled by the radio base station.

Overall E-UTRAN Architecture

The Evolved UMTS Terrestrial Radio Access Network (E-UTRAN) comprises of base stations called enhanced NodeBs (eNBs or eNodeBs). These base stations provide the protocol terminations for a user plane and a control plane towards the UE in the E-UTRAN. The eNBs are interconnected with each other by means of the X2 interface. The eNBs are also connected by means of the S1 interface to the Evolved Packet Core (EPC), more specifically to the Mobility Management Entity (MME) by means of the S1-MME interface and to the Serving Gateway (S-GW) by means of the S1-U interface. The S1 interface supports many-to-many relations between the MMES and the eNBs and between the S-GWs and the eNBs. The E-UTRAN architecture is illustrated in FIG. 1.

The eNB hosts functionalities such as Radio Resource Management (RRM), radio bearer control, admission control, header compression of user plane data towards the serving gateway, routing of user plane data towards the serving gateway. The MME is the control node that processes the signaling between the UE and the CN. The main functions of the MME are related to connection management and bearer management, which are handled via Non Access Stratum (NAS) protocols. The S-GW is the anchor point for UE mobility. The S-GW also includes other functionalities such as temporary DL data buffering while the UE is being paged, packet routing and forwarding the right eNB, gathering of information for charging and lawful interception. The PDN Gateway (P-GVV) is the node responsible for allocation of an Internet Protocol (IP) address of the UE. The PDN Gateway is also responsible for Quality of Service (QoS) enforcement, which is explained further below. FIG. 2 shows the functional split between E-UTRAN and EPC and gives a summary of the functionalities of the different nodes. The reader is referred to 3GPP TS 36.300 and the references therein for the details of the functionalities of the different nodes. In FIG. 2, the outer larger boxes depict the logical nodes; the boxes inside the outer larger boxes depict the functional entities of the control plane. The dashed boxes inside the outer eNB box depict the radio protocol layers.

OAM Architecture

A management system for managing the radio access network is shown in FIG. 3. Node Elements (NE), also referred to as eNodeB in FIG. 3 or eNB throughout the document, are managed by a Domain Manager (DM), also referred to as the Operation and Support System (OSS). A DM may further be managed by a Network Manager (NM). Two NEs are interfaced by X2, whereas the interface between two DMs is referred to as Itf-P2P. The management system may configure the NEs, as well as receive observations associated to features in the NEs. For example, the DM observes and configures the NEs, while the NM observes and configures the DM, as well as the NE via the DM.

It is further assumed that any feature that automatically optimizes parameters used by the NE may in principle be executed in the NE, DM, or the NM. Such features are referred to as Self-Organizing Network (SON) features.

Radio Protocol Architecture

The radio protocol architecture of E-UTRAN is divided into the user plane and the control plane.

User Plane

FIG. 4 shows a protocol stack for the user-plane comprising different layers. The protocol stack for the user plane is comprised of the Packet Data Convergence Protocol (PDCP) layer, the Radio Link Control (RLC) layer, and the Medium Access Control (MAC) layer. The PDCP layer, the RLC layer and the MAC layer are terminated at the eNB.

The PDCP manages IP packets in the user plane and it performs functionalities such as header compression, security, and re-ordering and retransmission during handover. The RLC layer is mainly responsible for segmentation and corresponding assembly of PDCP packets, such that the size of the PDCP packets fit a size for a packet that is actually to be transmitted over the air interface. The RLC may operate either in unacknowledged mode or acknowledged mode, where the latter supports retransmissions. The MAC layer performs multiplexing of data from different radio bearers. The MAC layer informs the RLC layer about the size of the Internet Protocol (IP) packets to provide, which is decided based on the required QoS of each radio bearer and a current capacity available to the UE.

Control Plane

FIG. 5 shows the protocol stack of the control plane. The layers below the Radio Resource Control (RRC) layer perform the same functionality as in the user plane except that there is no header compression in the control plane. The main functions of the RRC are broadcasting of system information, controlling an RRC connection, i.e. establishment, modification, and release of the RRC connection, establishment of Signalling Radio Bearers (SRBs) and Data Radio Bearers (DRBs), handover, configuration of lower protocol layers, radio link failure recovery, and measurement configuration and reporting. The details of the RRC protocol functionalities and procedures may be found in 3GPP TS 36.331.

The UE is uniquely identified over the S1 interface within an eNB with an Information Element (IE) named "eNB UE S1AP ID". When an MME receives the eNB UE S1AP ID it stores it for the duration of the logical S1-connection associated with the UE. Once the MME has identified the UE, the eNB UE S1AP ID IE is included in all UE associated S1-AP signalling. The eNB UE S1AP ID is unique within the eNB. After a handover, the UEs are assigned a new S1AP ID by a target eNB.

From the MME side, the UE is uniquely identified using the MME UE S1AP ID IE. When the eNB receives the MME UE S1AP ID the MME stores the MME UE S1AP ID for the duration of the logical S1 connection associated with the UE. Once known to an eNB this MME UE S1AP ID IE is included in all UE associated S1-AP signalling. The MME UE S1AP ID is unique within the MME, and it is changed if the UE connects to a new MME. This may for example happen after the handover between two eNBs connected to different MMEs.

Flow of User Plane and Control Plane Data

A flow of user plane and control plane data is illustrated in FIG. 6. There is only one MAC entity per UE, unless the UE supports multiple carriers as in the case of carrier aggregation. Under this MAC entity, several Hybrid Automatic Repeat reQuest (HARQ) processes may be running simultaneously for rapid retransmissions. There is a separate RLC entity for each radio bearer and if the radio bearer is configured to use PDCP, there is also one separate PDCP entity for that bearer. The bearer is configured to use PDCP only if the bearer is dedicated to a UE, i.e. multicast and broadcast data do not utilize PDCP both in the control and user plane and the PDCP is used only for dedicated control message in the control plane and for dedicated UL/DL data in the user plane.

With respect to the protocol stack shown in FIG. 2, each layer receives a Service Data Unit (SDU) from a higher layer, and sends a Protocol Data Unit (PDU) to the lower layer. For example, a PDCP PDU is sent towards the RLC, and the PDCP PDU is a RLC SDU from the point of view of the RLC. The RLC in turn sends an RLC PDU towards the MAC. The RLC PDU is a MAC SDU from the point of view of the MAC. In the opposite direction, the process is reversed, i.e. each layer passes the SDUs to the layer above, where the SDUs are perceived as PDUs.

Heterogeneous Networks and Dual/Multiple Connectivity

The use of a so called heterogeneous deployment or a heterogeneous network is illustrated in FIG. 7. It comprises of transmission nodes with different transmit power and with overlapping coverage areas. In a typical case, there may be multiple pico nodes within the coverage area of a macro node. The heterogeneous deployment is considered to be an interesting future deployment strategy for cellular networks. In such a deployment, the low-power nodes, hereafter also denoted as "pico nodes" are typically assumed to offer high data rates, Mbit/s, as well as provide high capacity, users/m2 or Mbit/s/m2, in the local areas where it is needed and/or desired The high-power nodes, hereafter also denoted as "macro nodes" are assumed to provide full-area coverage. In practice, the macro nodes may correspond to currently deployed macro cells while the pico nodes may be later deployed nodes, extending the capacity and/or achievable data rates within the macro-cell coverage area where needed.

A pico node in a heterogeneous deployment may correspond to a cell of its own, a "pico cell", see FIG. 8. This means that, in addition to downlink and uplink data transmission and/or reception, the pico node also transmits the full set of common signals and channels associated with a cell. In the LTE context this includes:

- The Primary and Secondary Synchronization Signals (PSS and SSS) corresponding to a Physical Cell Identity (PCI) of the pico cell.
- The Cell-specific Reference Signals (CRS), also corresponding to the PCI of the cell. The CRS may e.g. be used for downlink channel estimation to enable coherent demodulation of downlink transmissions.
- The Broadcast CHannel (BCH), with corresponding pico-cell system information. As the pico node transmits the common signals and channels, the corresponding pico cell may be detected and selected, i.e. connected to, by the UE.

If the pico node corresponds to a cell of its own, also so-called L1/L2 control signaling on the Physical Downlink Control Channel (PDCCH), as well as on the Physical Control Format Indicator Channel (PCFICH) and on the Physical Hybrid-ARQ Indicator Channel (PHICH), is transmitted from the pico node to the connected UEs, in addition to downlink data transmission on the Physical Downlink Shared Channel (PDSCH). The L1/L2 control signaling provides for example downlink and uplink scheduling information and HARQ-related information to UEs within the cell. This is shown in FIG. 8. The indices "p" and "m" in FIG. 8 indicate common signals/channels for the pico and macro cell respectively.

Alternatively, a pico node within a heterogeneous deployment may not correspond to a cell of its own but may just provide a data-rate and a capacity extension of the overlaid macro cell. This is sometimes known as a shared cell or a soft cell. In this case at least the CRS, a Physical Broadcast CHannel (PBCH), the PSS and the SSS are transmitted from the macro node. The PDSCH may be transmitted from the pico node. To allow for demodulation and detection of the PDSCH, despite the fact that no CRS is transmitted from the pico node, Demodulation Reference Signals (DM-RS) should be transmitted from the pico node together with the PDSCH. The UE-specific reference signals may then be used by the UE for demodulation and detection of the PDSCH. This is shown in FIG. 9 where the pico node does not correspond to a cell of its own.

Transmitting data from a pico node which do not transmit the CRS as described above requires support for DM-RS in the UE. A UE that supports DM-RS may be referred to as a non-legacy terminal. In LTE, DM-RS-based PDSCH reception is supported in Rel-10 and for Frequency Division Duplex (FDD). For the L1/L2 control signalling, DM-RS-based reception is planned for Rel-11. For UEs not supporting DM-RS-based reception, i.e. legacy UEs one possibility in a shared cell deployment is to exploit transmissions with a Single Frequency Network (SFN)—or a similar type of transmission. In essence identical copies of the signals and channels necessary for a legacy UE are transmitted simultaneously from the macro and pico nodes. From a perspective of the UE this will look as a single transmission. An SFN operation with identical transmission from macro and pico to a terminal, which is illustrated in FIG. 10, will only provide a Signal-to-Interference-plus-Noise Ratio (SINR) gain, which may be translated into a higher data rate but not into a capacity improvement. This is because transmission resources may not be reused across eNBs within the same cell.

If we may assume that the macros are able to provide coverage and the picos are there only for capacity enhancements, i.e. there are no coverage holes, another alternative architecture is where the UE maintains the connection with the macro node, called the "anchor" link, all the time, and adds a connection to the pico node, referred to as the booster link, when it is in the coverage area of the pico node. This is known as a dual connectivity and the idea may be extended to a multiple connectivity where the UE may be connected to one anchor node and several booster nodes. When both connections are active, the anchor link may be used for control signalling while the booster link is used for data. However, it will still be possible to send data also via the anchor link. Dual connectivity operation with the UE having simultaneous active connections with both the anchor and booster is illustrated in FIG. 11. Note that in this case, as in the previous cases, the system information is shown to be sent only from the macro nodes, but it is still possible to send it also from the pico nodes.

Wireless communications networks are becoming more flexible, for example with the use of heterogeneous networks. Such flexible networks also present problems, such as difficulty to serve UEs in proximity of two cells with good quality in both DL and UL due to the properties of such flexible networks. Such properties may be related to different transmission powers of base stations in the network. Flexible networks, such as heterogeneous networks, may offer higher capacity to user equipments by using dual connectivity, but sometimes at the cost of lower radio resource utilization.

SUMMARY

It is therefore an object of embodiments herein to solve some of the problems mentioned above.

According to a first aspect of embodiments herein, the object is achieved by a method in a first network node for splitting of a DownLink, DL, part and an UpLink, UL, part of a radio bearer between a first cell and a second cell in a wireless communications network. The radio bearer is associated to DL and UL transmissions between the first network node and a user equipment in the first cell.

The first network node transmits a handover request, which handover request indicates splitting of the DL part and the UL part of the radio bearer between the first cell and the second cell.

The first network node receives a handover request acknowledge of the handover request, which handover request acknowledge indicates admission of the splitting.

According to a second aspect of embodiments herein, the object is achieved by a first network node adapted for splitting of a DownLink, DL, and an UpLink, UL, part of a radio bearer between a first cell and a second cell in a wireless communications network. The radio bearer is associated to DL and UL transmissions between the first network node and a user equipment arranged to be located in the first cell, the first network node comprising a control and processing circuit and a transceiver circuit adapted to transmit a handover request. The handover request indicates splitting of the DL part and the UL part of the radio bearer between the first cell and the second cell.

The control and processing circuit and the transceiver circuit are further adapted to receive a handover request acknowledge of the handover request. The handover request acknowledge indicates admission of the splitting.

According to a third aspect of embodiments herein, the object is achieved by a method in a second network node for splitting of a DownLink, DL, and an UpLink, UL, part of a radio bearer between a first cell and a second cell in a wireless communications network. The radio bearer is associated to DL and UL transmissions between a first network node and a user equipment in the first cell. The second network node serves the second cell.

The second network node receives a handover request. The handover request indicates splitting of the DL part and the UL part of the radio bearer between the first cell and the second cell.

The second network node transmits a handover request acknowledge in response to the handover request. The handover request acknowledge indicates admission of the splitting.

According to a fourth aspect of embodiments herein, the object is achieved by a second network node adapted for splitting of a DownLink, DL, and an UpLink, UL, part of a radio bearer between a first cell and a second cell in a wireless communications network. The radio bearer is associated to DL and UL transmissions between a first network node and a user equipment arranged to be located in the first cell. The second network node serves the second cell. The second network node comprises a control and processing circuit and a transceiver circuit adapted to receive a handover request. The handover request indicates splitting of the DL part and the UL part of the radio bearer between the first cell and the second cell.

The control and processing circuit and the transceiver circuit are further adapted to transmit to the first network node, a handover request acknowledge in response to the handover request. The handover request acknowledge indicates admission of a handover.

According to a fifth aspect of embodiments herein, the object is achieved by a method in a core network node for splitting of a DownLink, DL, and an UpLink, UL, part of a radio bearer between a first cell and a second cell in a wireless communications network. The radio bearer is associated to DL and UL transmissions between a first network node and a user equipment in a first cell.

The core network node receives a second path switch request indicating user plane switch of only one of the DL part or the UL part of the radio bearer between the first cell and the second cell.

The core network node transmits an acknowledge of the second path switch request. The acknowledge of the second path switch request indicates user plane switch of only one of the DL part or the UL part of the radio bearer between the first cell and the second cell.

According to a sixth aspect of embodiments herein, the object is achieved by a core network node adapted for splitting a DownLink, DL, and an UpLink, UL, part of a radio bearer between a first cell and a second cell in a wireless communications network. The radio bearer is associated to DL and UL transmissions between a first network node and a user equipment in a first cell. The core network node is adapted to receive a second path switch request indicating user plane switch of only one of the DL part or the UL part of the radio bearer between the first cell and the second cell.

The core network node is further adapted to transmit an acknowledge of the second path switch request. The acknowledge of the second path switch request indicates user plane switch of only one of the DL part or the UL part of the radio bearer between the first cell and the second cell.

BRIEF DESCRIPTION OF THE DRAWINGS

Examples of embodiments herein are described in more detail with reference to attached drawings in which.

DETAILED DESCRIPTION

As part of developing embodiments herein, some problems will first be identified and discussed.

Protocol Architecture for Dual Connectivity

Figure 12:
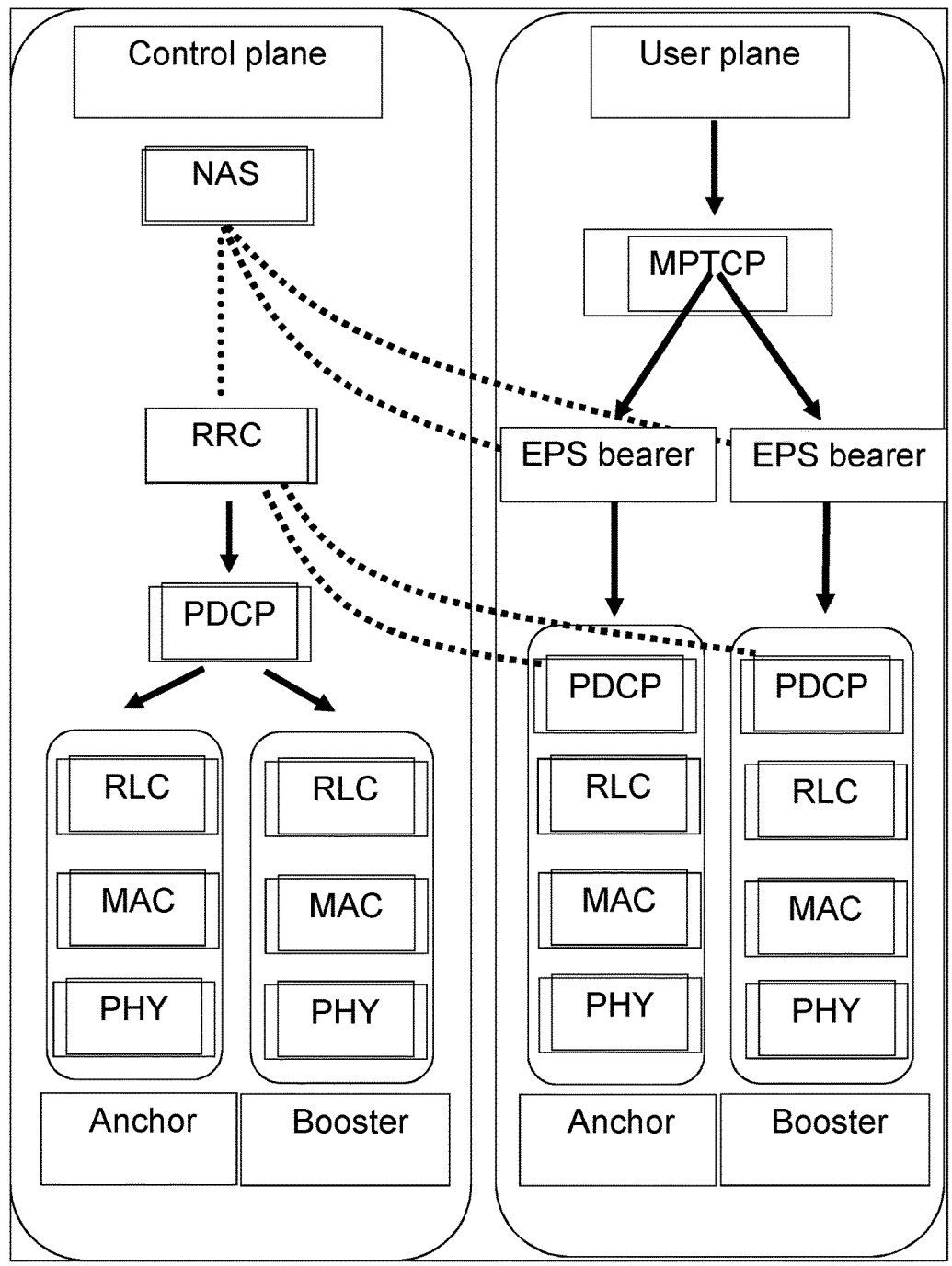
FIG. 12 is a schematic block diagram illustrating an example of a protocol architecture for multiple connectivity.

In order to support multiple connectivity, several architectural options are possible both for the control and user plane. For the user plane, a centralized approach is to let the PDCP, or even the RLC, terminate at the anchor only and the RLC, or even the MAC, terminates at the booster. A decentralized approach may be to let the PDCP terminate at the booster. A similar approach may be taken for the control plane, i.e. distributed or centralized PDCP and RLC. On top of that there is the additional dimension of centralizing or distributing the RRC. FIG. 12 shows an example of architecture of control and user plane protocol for multiple connectivity. Here the user plane is employing distributed PDCP, while the control plane is centralized at the PDCP level at the anchor. Note that in FIG. 12, user plane aggregation, i.e. the possibility to split application layer packets belonging to one application data flow, over the anchor and booster links, may be realized at different protocol layers levels, for example by using a higher layer aggregation protocol like a Multi-path Transmission Control Protocol (MTCP).

Handover

Handover is an important aspect of any wireless communications network. In some of the figures comprised herein handover is abbreviated with HO. With the handover the system tries to assure service continuity of the UE by transferring the connection between the communications network and the UE from one cell to another cell. When and to what cell the handover occurs depends on several factors such as signal strength of reference signals, load conditions in the cells, service requirements of the UE, etc. The provision of efficient/effective handovers (minimum number of unnecessary handovers, minimum number of handover failures, minimum handover delay, etc.), would affect not only the QoS of the end user but also the overall mobile network capacity and performance.

In LTE, handover controlled by the communications network and assisted by the UE is utilized, for example described by 3GPP TS 36.300. The handover is based on UE reports. The UE is moved, if required and if possible, to the most appropriate cell that will assure service continuity and quality.

Figure 13A:
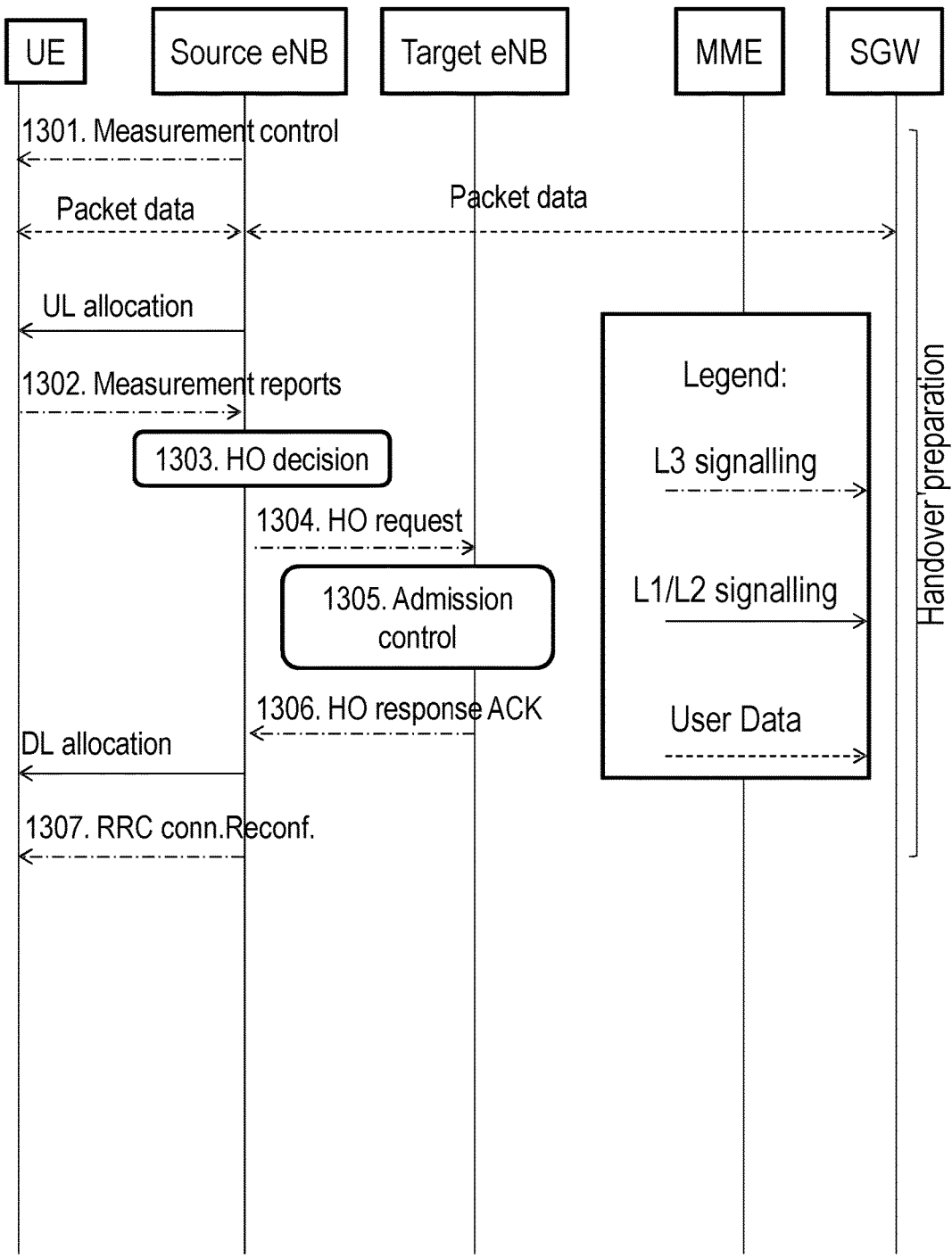
FIG. 13*a* is a signaling diagram illustrating X2 Handover in LTE.
Figure 13B:
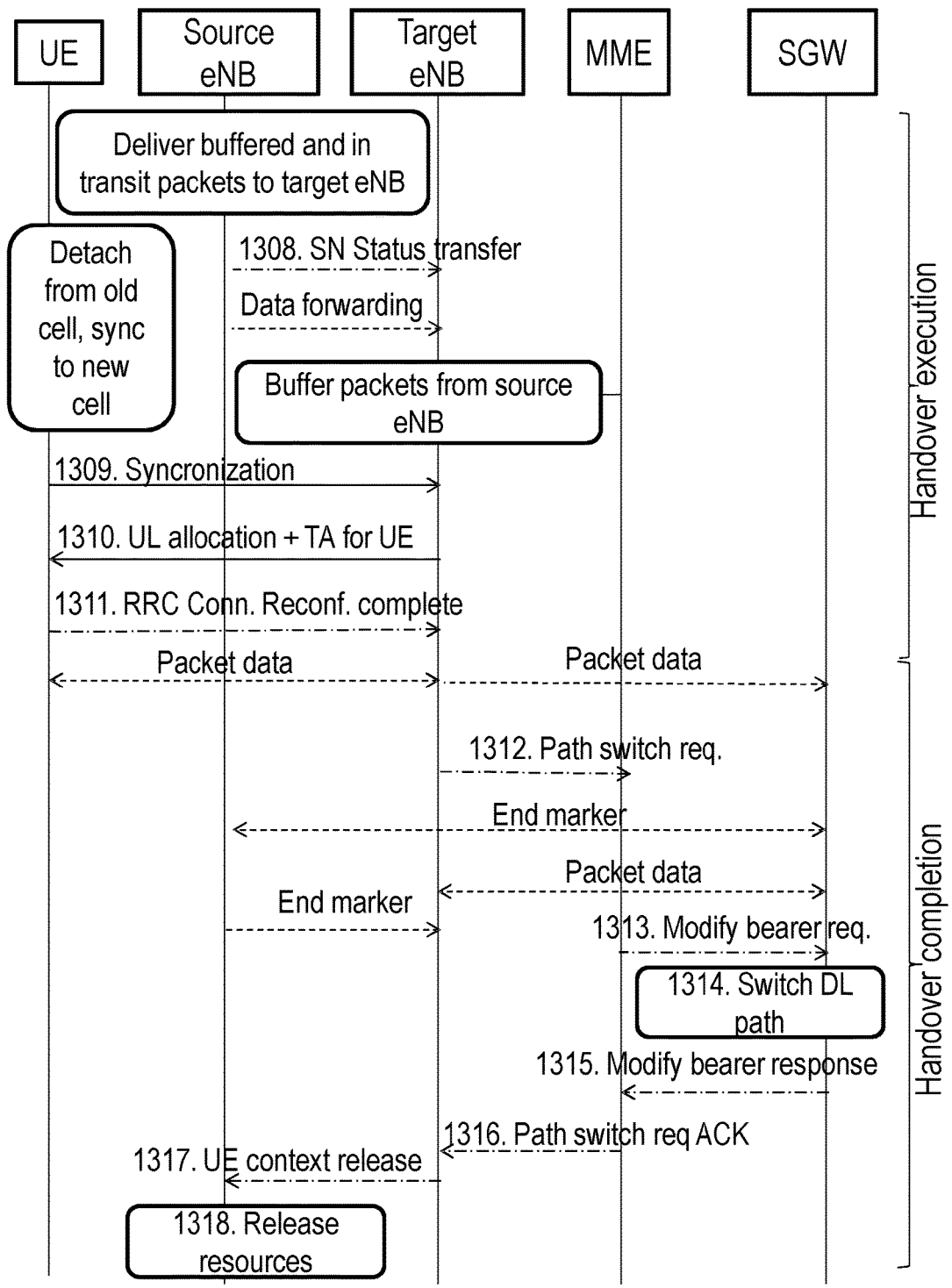
FIG. 13*b* is a signaling diagram illustrating X2 Handover in LTE.

Handover is performed via the X2 connection, whenever available. If the X2 is not available, handover is performed using the S1 connection, i.e. involving the CN. The X2 Handover process is shown in FIG. 13a and FIG. 13b. The handover procedure may be sub divided into three stages of preparation, also referred to as initiation, execution and completion.

The main steps of the handover process are:

1301. The eNB serving the UE before the handover, also referred to as source eNB, configures the measurement procedures for the UE. This may be done either when the UE first connects to the source eNB, i.e. it may be included in the handover command as described later, or later on by sending measurement reconfigurations. The measurement reconfigurations are sent to the UE by using a measConfig Information Element (IE) that is included in the RRCConnectionReconfiguration message.

1302. The UE is triggered to send a measurement report by the measurement rules, which are set as described above.

1303. Based on the received measurement report and on other RRM information, the source eNB makes a decision to hand over the UE to the target eNB.

1304. The source eNB transmits a HANDOVER REQUEST message to the target eNB. The message passes information that is necessary to prepare the handover at the target side. The source eNB must indicate the cause of the handover in this message, which may be e.g.
 a. Handover Desirable for Radio Reasons
 b. Resource Optimization Handover
 c. Reduce Load in Serving Cell The X2: HANDOVER REQUEST message currently specified is shown below. The handover procedures both over the X2 interface and over the S1 interface handle the case of relocation of full bearers. Namely, both UL and DL data paths for a bearer are relocated from source eNB to target eNB during handover procedures.

1305. Admission Control, namely the process according to which it is assessed whether the UE with all/part of its bearers can be admitted in the target cell, may be performed by the target eNB.

1306. The target eNB prepares handover with L1/L2 and sends a HANDOVER REQUEST ACKNOWLEDGE to the source eNB. The HAN DOVER REQUEST ACKNOWLEDGE message includes an IE called "Target eNB to Source eNB Transparent Container". This IE comprises the handover command message, RRCConnectionReconfiguration, that includes a mobilityControlInfo IE that is sent to the UE in the next step.

NOTE: As soon as the source eNB receives the HANDOVER REQUEST ACKNOWLEDGE, or as soon as the transmission of the handover command is initiated in the downlink, user plane data forwarding may be initiated.

1307. The source eNB sends the handover command, i.e. the RRCConnectionReconfiguration message including the mobilityControlInfo, to the UE on behalf of the target eNB.

1308. The source eNB sends the Sequence Number (SN) STATUS TRANSFER message to the target eNB, which message includes the ID of the impacted Enhanced Radio Access Bearer (E-RAB) and PDCP SN for UL and DL data transfer.

1309. After receiving the RRCConnectionReconfiguration message including the mobilityControlInfo, the UE performs synchronisation to the target eNB and accesses the target cell via a Random Access Channel (RACH). If the received RRCConnectionReconfiguration contained dedicated RACH information, a dedicated preamble included in the RRCConnectionReconfiguration message is used for the RACH access. Otherwise, a contention based approach is taken. The UE also configures the lower layer protocol stacks based on the received configuration information.

1310. The target eNB responds to the RRCConnectionReconfiguration message with UL allocation and timing advance.

1311. When the UE has successfully accessed the target cell, the UE sends the RRCConnectionReconfigurationComplete message to the target eNB to confirm that the handover succeeded. Optionally, the UE may indicate to the target eNB if it has information regarding earlier Radio Link Failure (RLF) or other logged measurements that may be used for optimisation purposes. After the confirmation has been received, the target eNB may begin to send data to the UE and the UE may send data to the target eNB based on the scheduling grants it is receiving. However, the data from the CN is still routed to the source eNB.

1312. The target eNB sends a PATH SWITCH REQUEST (PSR) message to MME to inform the MME that the UE has changed cells. If not all the UE bearers are included in a E-RAB To Be Switched in Downlink List, the MME considers the non-included E-RABs as implicitly released by the eNB, which is described in TS 36.413. That is, normal operation will be for the target eNB to list only those bearers that it has admitted during admission control and that it has communicated earlier to the source eNB via the HANDOVER REQUEST ACKNOWLEDGE message. The MME releases the non-accepted dedicated bearers by triggering bearer release procedures as described in 3GPP TS 23.401.

1313. The MME sends a MODIFY BEARER REQUEST message to the Serving Gateway. The MME includes the bearers to be switched to the new target in the "Bearer contexts to be modified" field and the ones not received in the PATH SWITCH REQUEST message in the "Bearer context to be removed" field of the MODIFY BEARER REQUEST message (3GPP TS 29.274).

1314. The Serving Gateway switches the downlink data path to the target side. That is, it starts sending downlink packets to the target eNodeB using the newly received address and TEIDs, which is described in 3GPP TS 23.401. The Serving gateway sends one or more end marker packets on the old path to the source eNB and then may release any userplane and/or TNL resources towards the source eNB.

1315. The Serving Gateway sends a MODIFY BEARER RESPONSE message to the MME.

1316. The MME confirms the PATH SWITCH REQUEST message with a PATH SWITCH REQUEST ACKNOWLEDGE message.

1317. By sending a UE CONTEXT RELEASE message, the target eNB informs about the success of the handover to the source eNB and triggers the release of resources by the source eNB.

1318. Upon reception of the UE CONTEXT RELEASE message, the source eNB releases radio and C-plane related resources associated to the UE context. Any ongoing data forwarding may continue.

The only mechanisms currently described to mitigate DL interference from one aggressor cell, i.e. interfering cell, to a victim cell, i.e. interfered cell, rely on partitioning time and frequency resources between the aggressor cell and the victim cell in a way that the resources utilized by the victim cell for UEs at cell edge with the aggressor cell are not heavily utilized by the aggressor cell.

One of these techniques is the Almost Blank Subframes (ABS) allocation. Despite these techniques being effective, they imply a reduction of overall system capacity because only one of the aggressor and victim cells may utilize certain time-frequency resources within a certain time window and within a certain geographical area.

In embodiments herein methods and apparatuses for increasing the radio resource utilisation efficiency in a wireless communications network are disclosed. This may be done by splitting the DL and the UL transmissions between two cells. In this way the network nodes ensures that the UE is connected in UL and DL to the cell that may serve the UE best.

One advantage of embodiments herein is that cross UL and/or DL interference may be mitigated.

Another advantage is that existing signalling may be used to split the DL part and the UL part of the radio bearer.

Figure 14:
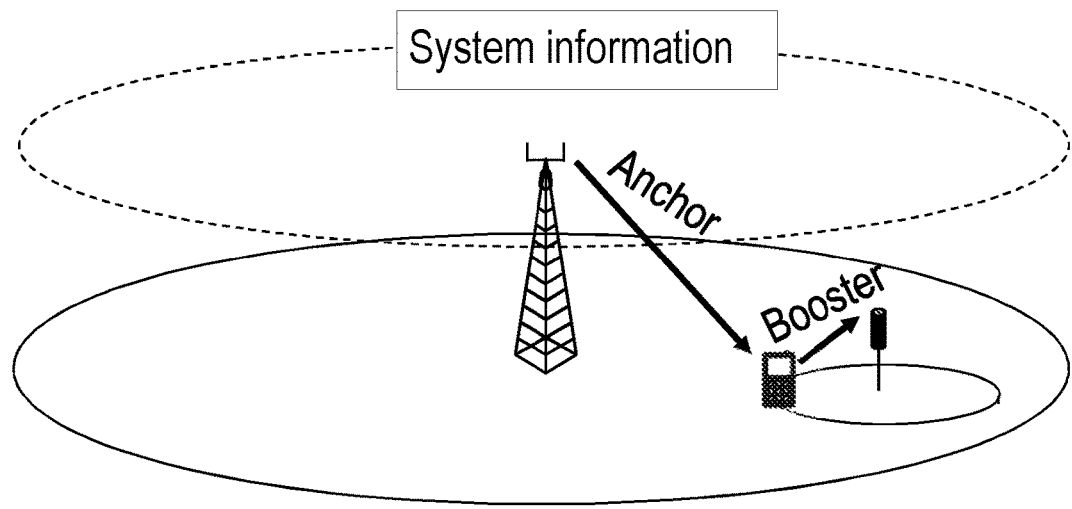
FIG. 14 is a schematic block diagram illustrating embodiments of a wireless communications network.

For example, by splitting DL and UL transmission between the Macro eNB and the LPN, as shown in FIG. 14, it is possible to mitigate DL interference from a macro eNB to UEs served by the pico eNB. In general it is possible to mitigate cross UL or DL interference generated in the following cases:

Interference from a Macro eNB towards UEs connected to a pico cell, i.e. Pico UEs, in DL Interference from a Pico eNB towards UEs connected to a Macro cell, i.e. Macro UEs, in DL
Interference from the Macro UEs towards Pico eNBs in UL
Interference from the Pico UEs towards Macro eNBs in UL The splitting of the DL and UL transmissions, also referred to as a DL/UL split hereafter, means that the UE receives DL traffic associated to one or more bearers from one of the eNBs, e.g. the Macro eNB, and that the UE transmits UL traffic associated to one or more bearers to a different eNB, such as the Pico eNB.

Figure 1:
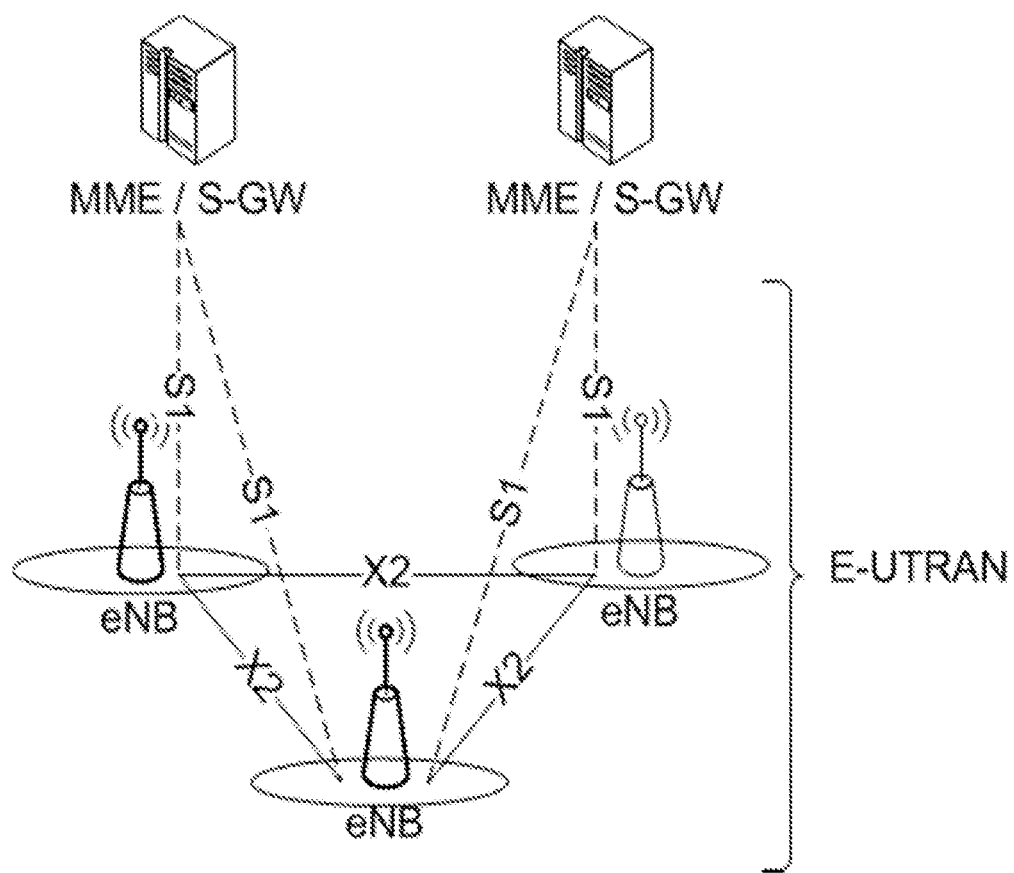
FIG. 1 is a schematic block diagram illustrating overall E-UTRAN architecture.
Figure 2:
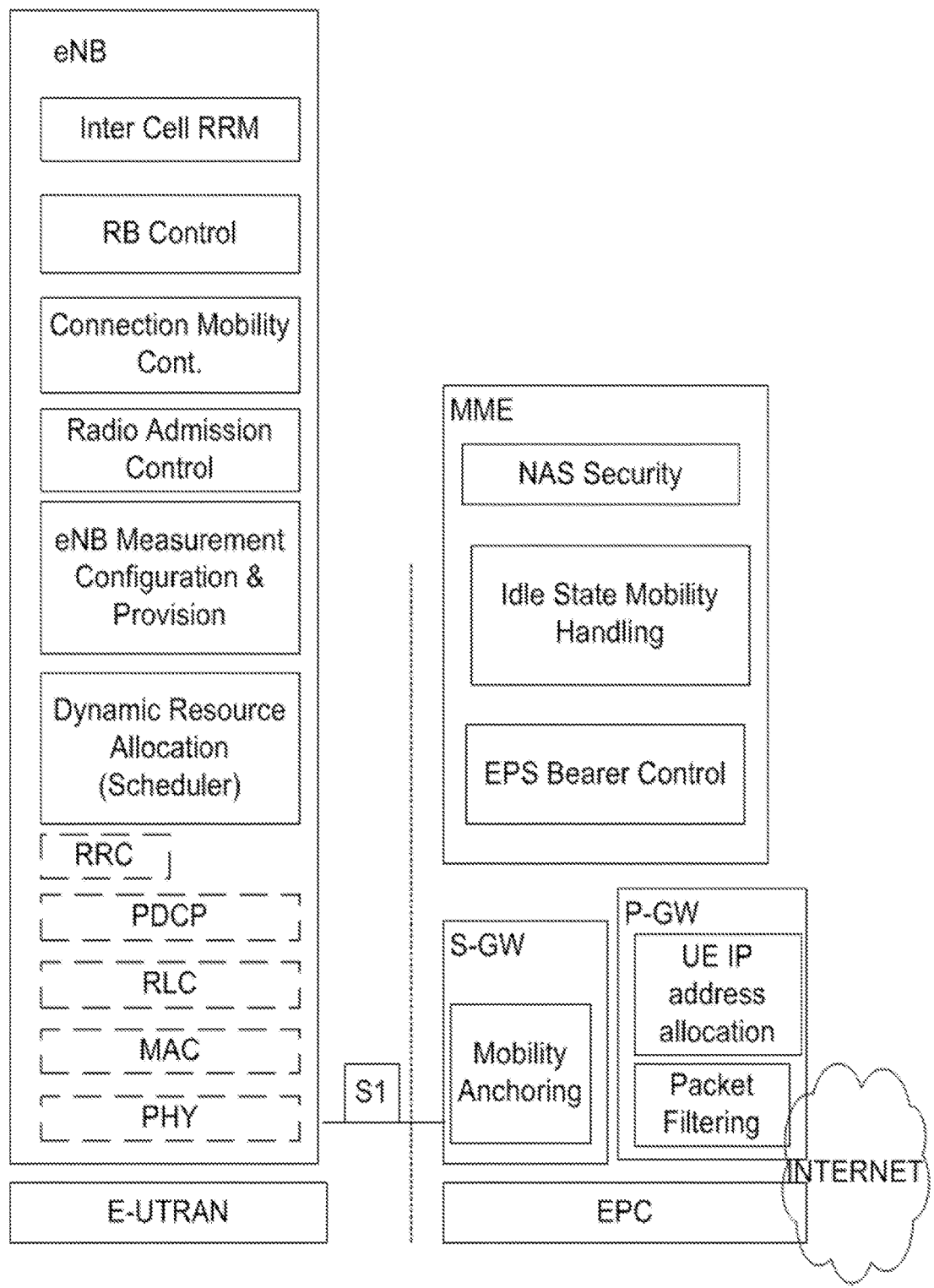
FIG. 2 is a schematic block diagram illustrating functional split between E-UTRAN and EPC
Figure 3:
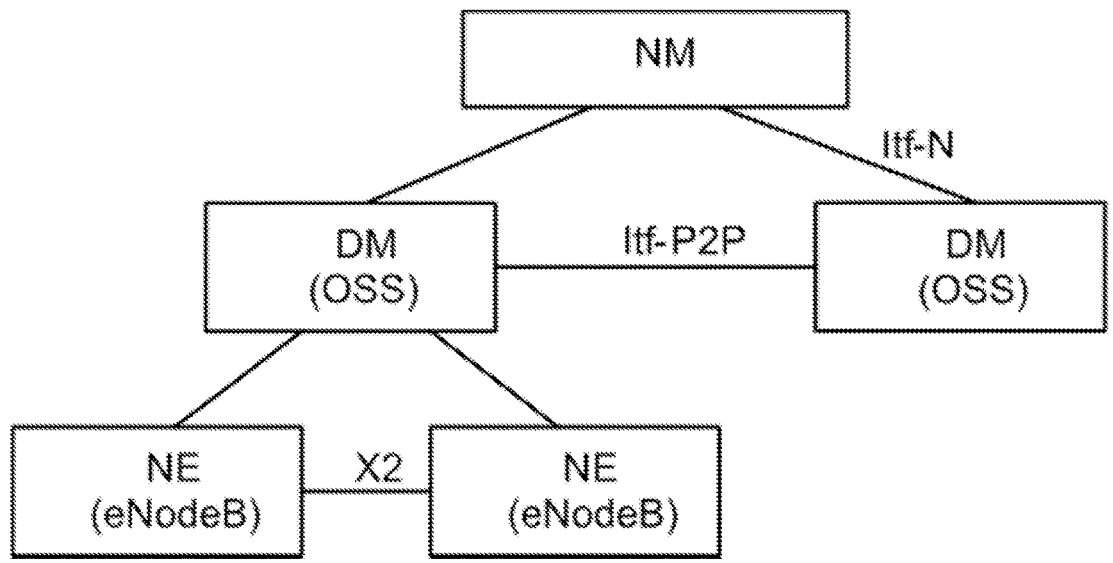
FIG. 3 is a schematic block diagram illustrating a management system architecture of a prior art wireless communications network.
Figure 4:
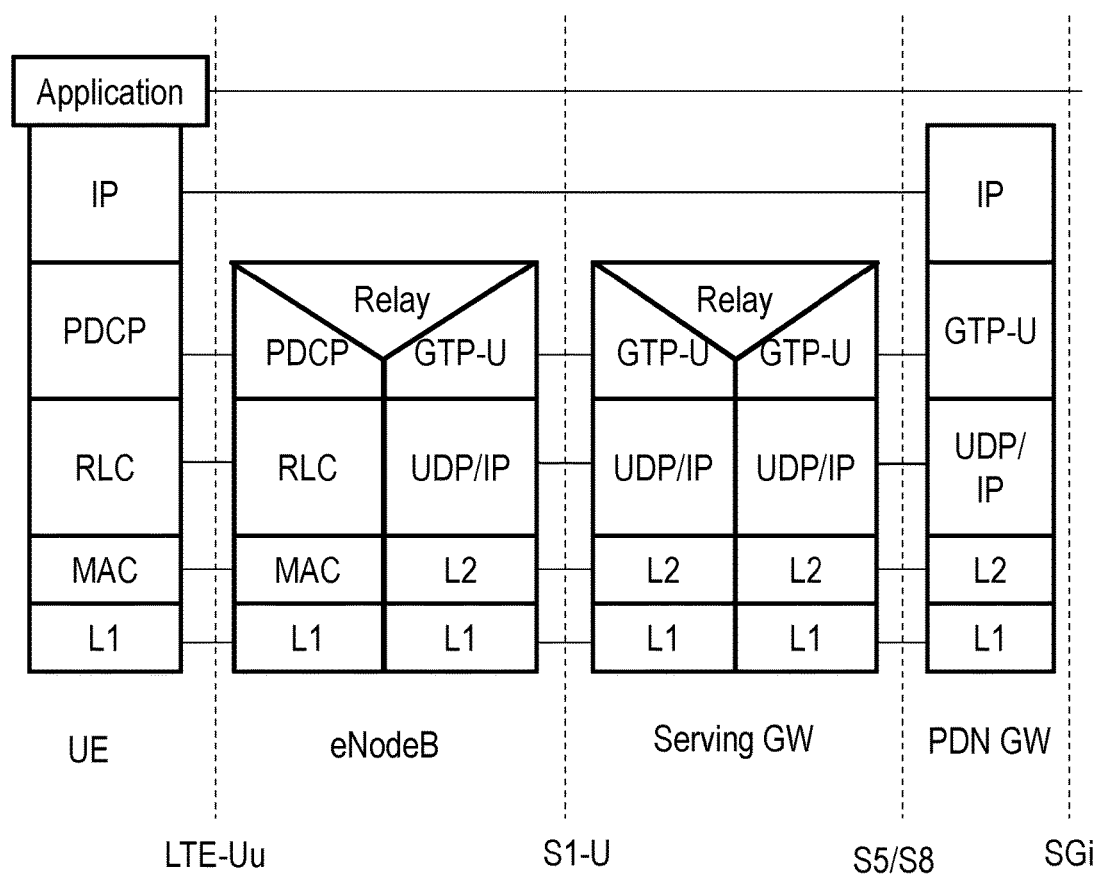
FIG. 4 is a schematic block diagram illustrating a user plane protocol stack.
Figure 5:
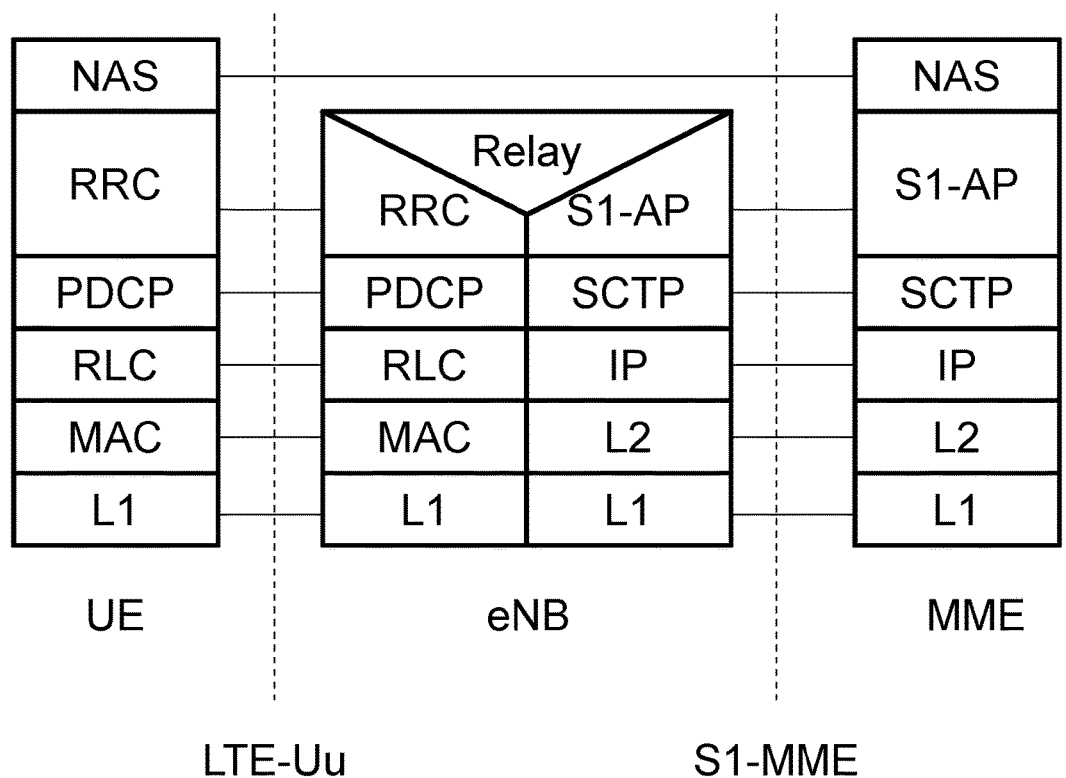
FIG. 5 is a schematic block diagram illustrating a control plane protocol stack.
Figure 6:
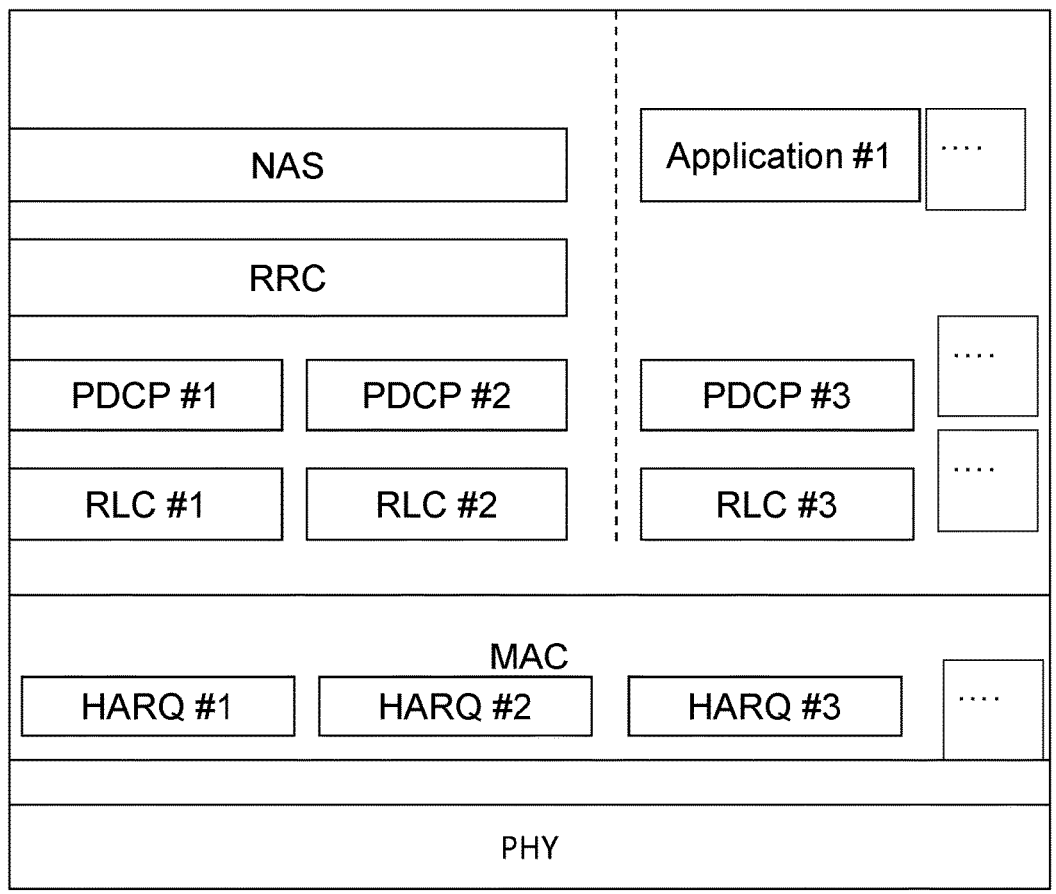
FIG. 6 is a schematic block diagram illustrating a user plane and control plane data flow.
Figure 7:
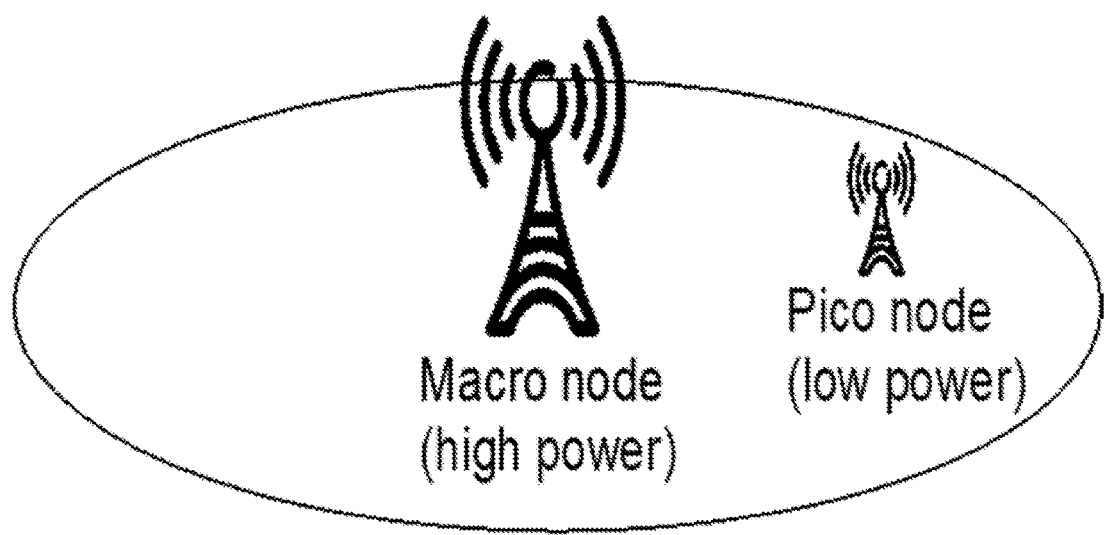
FIG. 7 is a schematic block diagram illustrating a heterogeneous deployment of a wireless communications network with a higher-power macro node and a lower-power pico node.
Figure 8:
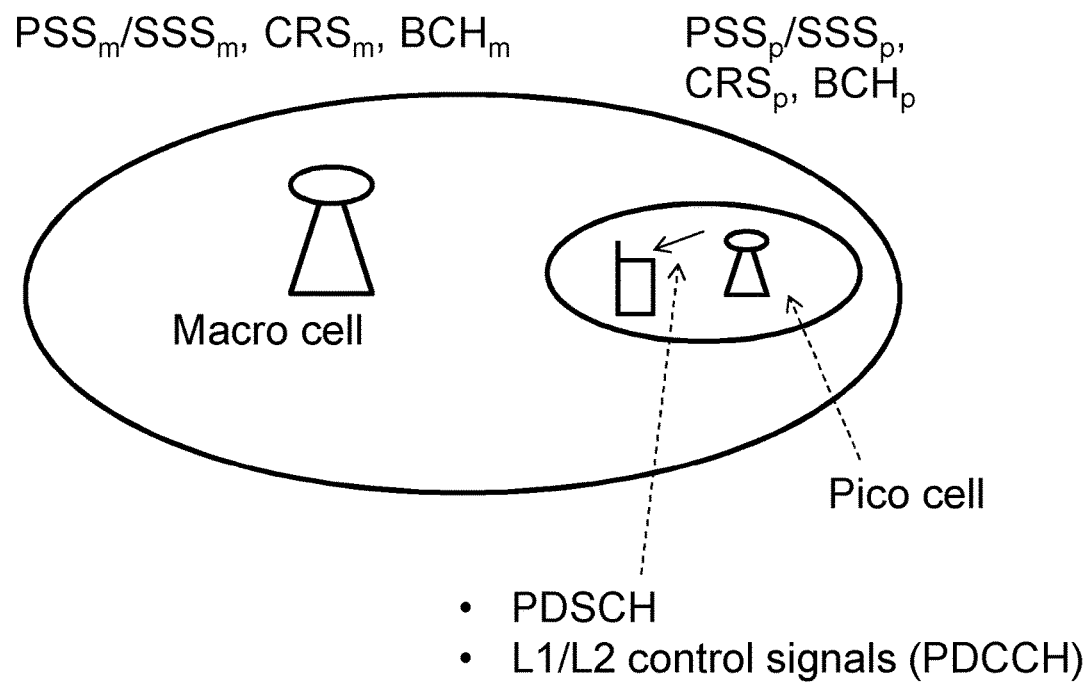
FIG. 8 is a schematic block diagram illustrating a heterogeneous deployment of a wireless communications network where the pico node corresponds to a cell of its own.
Figure 9:
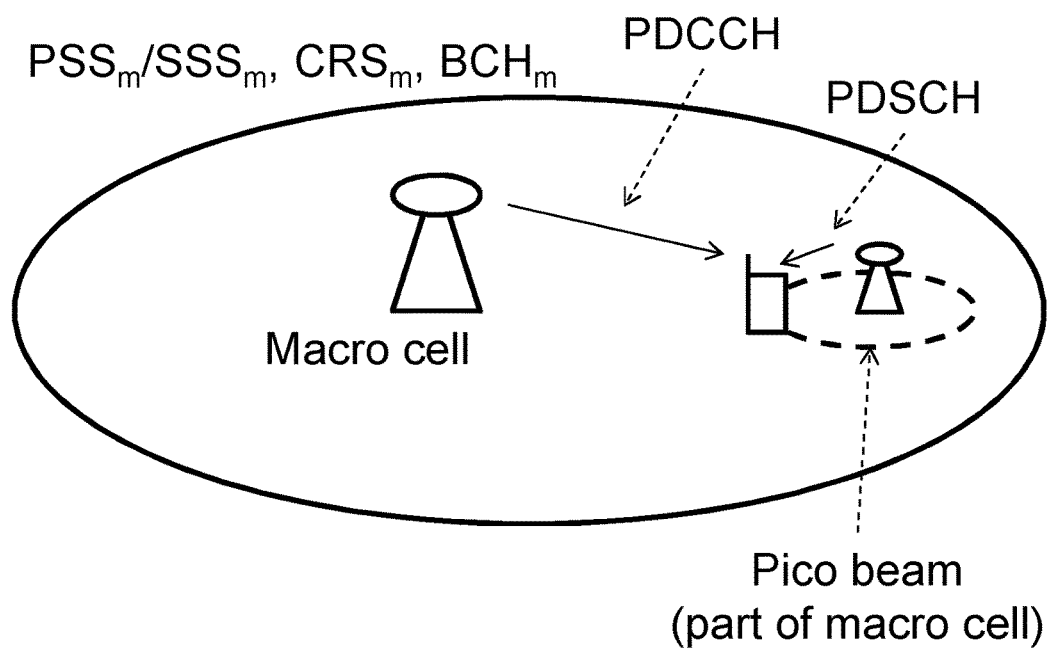
FIG. 9 is a schematic block diagram illustrating a heterogeneous deployment of a wireless communications network where the pico node does not correspond to a cell of its own.
Figure 10:
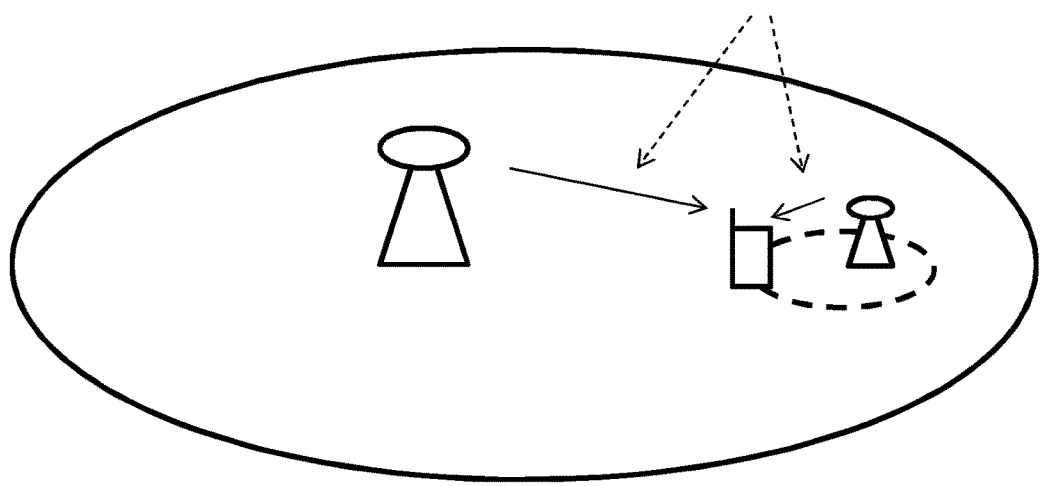
FIG. 10 is a schematic block diagram illustrating a heterogeneous deployment of a wireless communications network with SFN operation.
Figure 11:
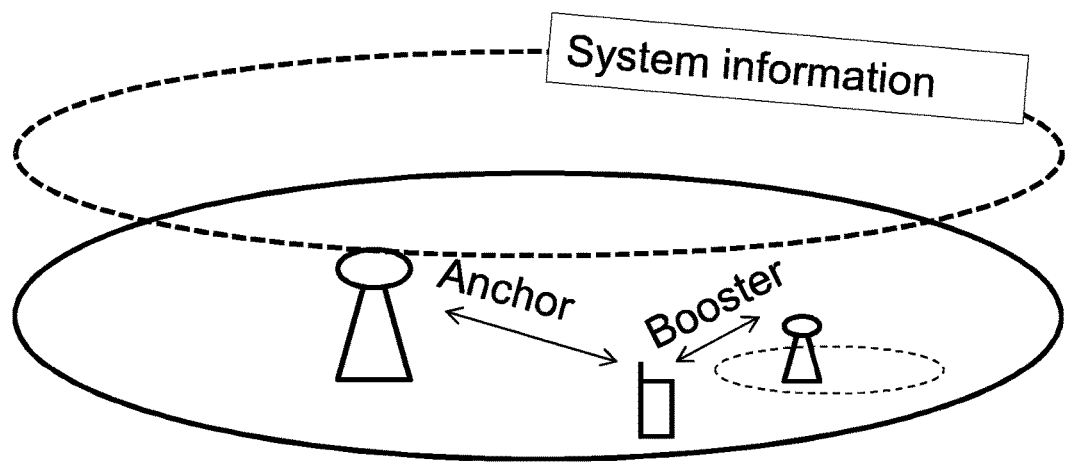
FIG. 11 is a schematic block diagram illustrating a heterogeneous deployment of a wireless communications network with dual connectivity operation.

It may be seen from FIG. 11 that a UE in proximity of a small cell served by an LPN might be much closer to the LPN than to the macro eNB. In this case embodiments herein may exploit the higher transmission power of the Macro eNB to receive DL signals at the UE and exploit the short distance between the UE and the LPN to allow the UE to transmit UL signals to the LPN.

To implement the split of DL and UL transmissions embodiments herein account for the possibility of a handover where only the DL part or UL part of one or more bearers is relocated. Moreover, embodiments herein describe the triggering mechanisms for such a DL- or UL-only relocation.

The terms Pico UE and Macro UE are used herein only to specify to which base station the UE is connected. The terms imply no other difference between a Pico UE and a Macro UE. In fact, splitting the DL and UL transmissions, as described by embodiments herein, is applicable independent from the base station type. That is to say, the handover from macro eNB to a pico eNB is equally applicable to the procedure of the handover from a pico eNB to a macro eNB.

Figure 15:
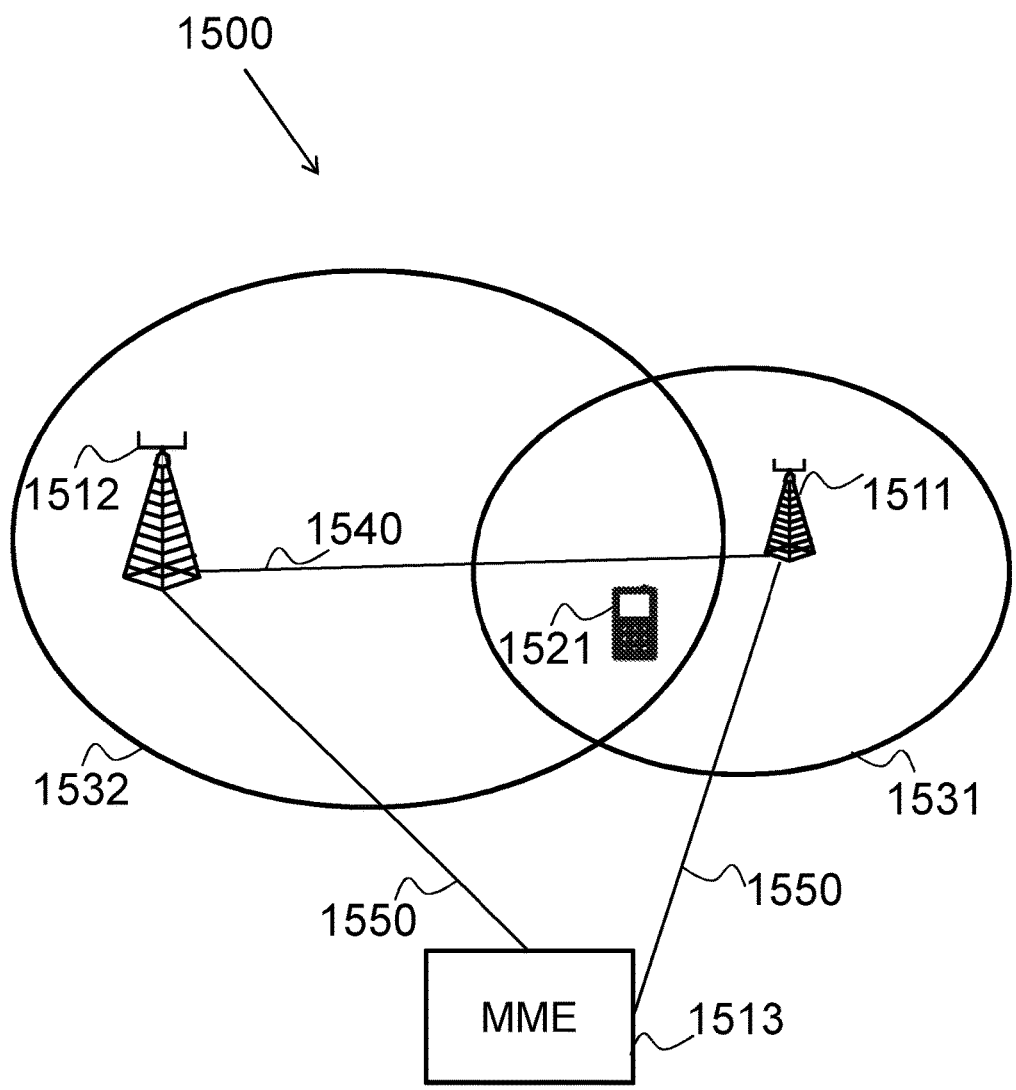
FIG. 15 is a schematic block diagram illustrating further embodiments of a wireless communications network.

FIG. 15 depicts a wireless communications network 1500 in which embodiments herein may be implemented. The wireless communications network 1500 may for example be an LTE network, a WCDMA, an LTE-Advanced or an GSM/EDGE network.

The wireless communications network 1500 comprises at least two transmitting network nodes. For example a first network node 1511 and a second network node 1512. The first and second network nodes 1511, 1512 may each be any one out of a radio base station such as e.g. a NodeB, a macro node, an LPN or any other network node capable to serve a user equipment or a user node in a wireless communications network. Taking the first scenario as an example, the first network node 1511 may be a Pico eNB and the second network node 1512 may be a Macro eNB in an LTE network.

The first network node 1511 communicates with user equipments, such as a user equipment 1521, in a first cell 1531 served by the first network node 1511. The second network node 1512 may communicate with user equipments, not shown in FIG. 16, in a second cell 1532 served by the second network node 1512. The communication between the first network node 1511 and the user equipment 1521 is performed through a radio bearer. The radio bearer comprises a DL part associated to DL transmissions, and an UL part associated to UL transmissions.

In some embodiments the first network node 1511 may also communicate with user equipment in the second cell 1532. In other words, in some embodiments the first network node 1511 may also serve the second cell 1532. This is the case where source and target cells are served by the same eNB. The first network node 1511 may then effectively replace the second network node 1512 in embodiments herein.

The wireless communications network 1500 may further comprise a core network node 1513, such as a Mobility Management Entity (MME). The core network node 1513 is the control node that processes the signaling between the user equipment 1521 and a core network. The main functions of the MME are related to connection management and bearer management.

The first and the second network nodes 1511, 1512 may communicate with each other over an interface 1540, such as an X2 interface. The interface 1540 may for example comprise landlines or radio communication or a combination thereof.

The first and the second base stations 1511, 1512 may each communicate with the core network node 1513 over an interface 1550, such as an S1 interface. The interface 1550 may for example comprise landlines.

In current specifications mobility is associated to one UE and to all the bearers associated to such UE. Namely, when the handover occurs, all the bearers for one UE are relocated from the source cell to the target cell.

The solutions for mobility described so far do not account for uplink (UL) and downlink (DL) split. The latter is a concept according to which a UE, such as the user equipment 1521, may receive DL traffic associated to one or more bearers from one eNB, such as the first network node 1511, and it may transmit UL traffic associated to one or more bearers to a different eNB, such as the second network node 1512.

By splitting the DL and UL transmissions of the UE it is possible to optimize channel conditions for the UE when it is in proximity of two cells, e.g. a macro cell, such as the second cell 1532, and a smaller cell, such as the first cell 1531, which may be a pico cell. The DL/UL split increases the radio resource utilization efficiency by ensuring that the UE is connected in UL and DL to the cell that serves the UE best.

For example, a UE, such as the user equipment 1521, within a macro cell coverage, such as the coverage of the second cell 1532, and at cell edge with a small cell, such as the first cell 1531, comprised in the macro cell could be served in DL by the macro eNB, such as the second network node 1512, which due to the higher DL power may serve the UE better, and it could send its UL traffic to the small cell's eNB, such as the first network node 1511, which is better given the shorter distance between the UE and the Pico eNB.

Embodiments herein describe the procedures needed for triggering and executing UL/DL split between two neighbouring cells served by the same or different eNBs. Some of the scenarios addressed by embodiments herein are as follows:

1. The Pico UEs, such as the user equipment 1521, at cell border between a small cell, such as the first cell 1531, and a macro cell, such as the second cell 1532, cannot be served with a good DL quality due to the DL interference from the Macro eNB, such as the second network node 1512. In this case legacy mechanisms such as ABS allocation from the Macro eNB may be applied. Embodiments herein provides a more efficient way by moving the DL channels of the Pico UEs at cell edge with the macro cell to the Macro eNB.
2. The Pico UEs, such as the user equipment 1521, at cell border between the small cell, such as the first cell 1531, and the macro cell, such as the second cell 1532, cannot be served with a good UL quality due to the UL interference from the UEs served by the Macro eNB, such as the second network node 1512. In this case embodiments herein allow moving the UL channels of the Pico UEs to the Macro eNB.
3. The Macro UEs at cell border between the macro cell and small cell cannot be served with good UL quality due to UL interference from the Pico UEs, such as the user equipment 1521. In this case the embodiments herein allow for moving the UL channels of the Pico UE, such as the user equipment 1521, from the pico eNB, such as the first network node 1511, to the macro eNB, such as the second network node 1512, or moving the UL channels of the macro UE from the macro eNB to the pico eNB. In this way the UL interference is mitigated.

Embodiments herein allow enabling handover signaling for cases where an UL or a DL part of a given bearer is moved from one cell to another. Embodiments herein also allow a selection of whether the handover procedure for UL or DL should also imply handing over all or part of the bearer components.

Embodiments herein allow flexibility in the bearer traffic distribution between neighbouring cells, such as the first cell 1531 and the second cell 1532. An example of the application of embodiments herein is in the small cells scenarios, where the UL/DL split may be shared between macro cells served by a macro eNB and small cells served by a low power node such as a pico eNB.

It shall be noted that the network deployment considered in embodiments herein, which comprises a macro node and a pico node, has been chosen only for reasons of simplicity. The method and the apparatuses described herein may be used in any deployment where any two neighbour cells cooperate according to the principles explained above and below in order to optimise mobile communication.

In the following an LTE network is taken as an example for the description of the procedures. However, the person skilled in the art will readily adapt the presented embodiments to any communications network in which UL and DL communication occurs for user equipment, such as e.g. WCDMA, LTE-Advanced or GSM/EDGE.

Figure 16:
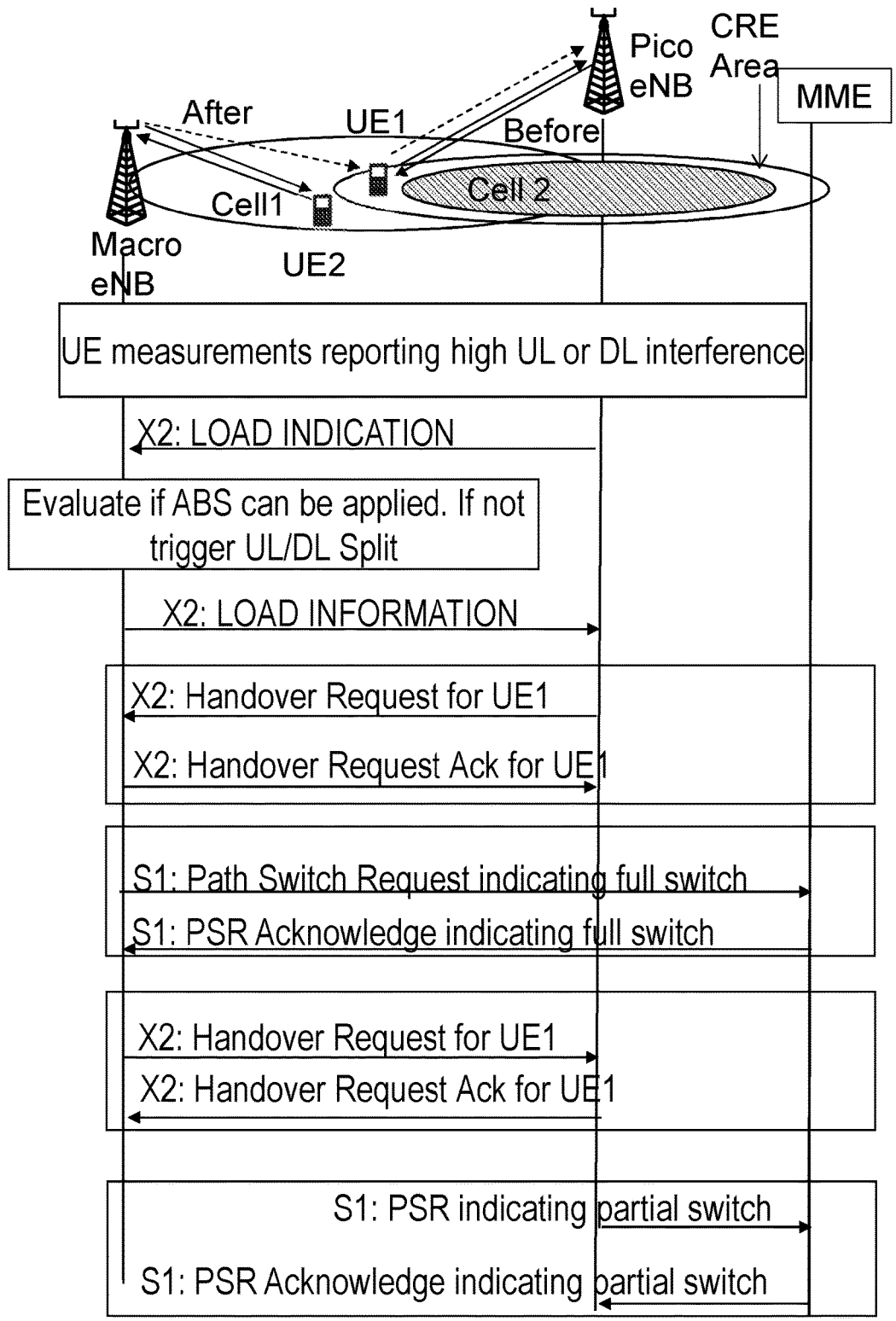
FIG. 16 is a schematic block diagram and a signalling diagram illustrating embodiments of a method in a wireless communications network.

In some first embodiments the first network node 1511, which may be a Pico eNB, may operate as shown in FIG. 16. Taking the first scenario as an example, the first network node 1511 may detect, for example by means of receiving UE measurement reports, that the user equipment 1521, e.g. a Pico UE, at cell edge between the second cell 1532, which may be a macro cell, and the first cell 1531, which may be a pico cell, is affected by harmful DL interference. This is also described in action 1801 and action 1901 below.

For reason of simplicity the cell edge area between the pico cell and the Macro cell will from now on be called Cell Range Extension (CRE).

Embodiments allow for an network node, such as the second network node 1512, to evaluate whether it is more convenient to allocate ABS subframes in the aggressor cell, such as the second cell 1532, or to trigger an UL/DL split with a neighbour victim cell, such as the first cell 1531, so that the UE, e.g. the user equipment 1521, receives DL transmissions from the second cell 1532, e.g. the macro cell. This is described in actions 1803 and 2102 below. For example one reason why ABS may not be allocated in the aggressor cell may be that there is a shortage of resources for UEs served by the aggressor cell and therefore allocation of ABS subframes would worsen even more resource availability. Another example may be that ABS allocation may clash with the scheduling policies adopted by the second network node 1512, i.e. the aggressor eNB.

In case the decision is that of triggering an UL/DL split, this information may be provided via a new IE, such as an UL-DL Split Indication IE, or via a new value in an existing IE in the LOAD INFORMATION message shown in FIG. 16. This is further described in actions 1804 and 2103 below.

Once the UL/DL split handover has been indicated, e.g. via LOAD INFORMATION, a first handover procedure may be carried out to move the user equipment 1521 affected by DL interference to the neighbour cell served by the second network node 1512. This is further described in actions 1805, 1806, 1904, 1905, 2104 and 2105 below. The X2: HANDOVER REQUEST message from the first network node 1511 to the second network node 1512 may be enhanced with a new IE indicating the UL/DL split. This handover procedure has the main role of moving the control plane from the first network node 1511 to the second network node 1512, i.e. moving the control plane anchor from the first network node 1511 to the second network node 1512.

After this handover procedure is completed, a second procedure may be started, described in actions 1809, 1810, 1906, 1907, 2108 and 2109, where only UL channels are relocated from the serving macro cell to the target pico cell. This may be achieved by adding new IEs to the X2: HANDOVER REQUEST message.

Figure 17:
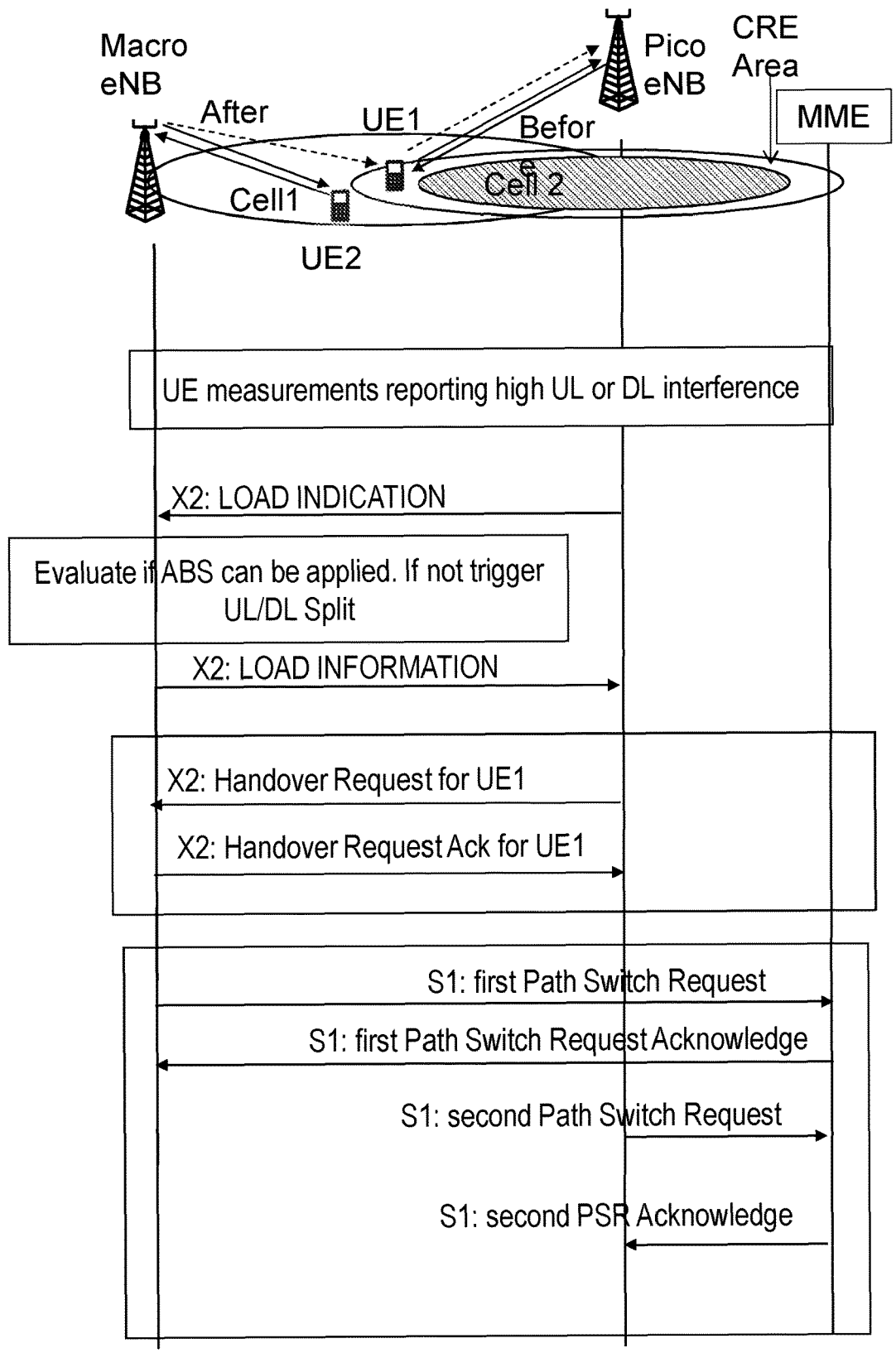
FIG. 17 is a schematic block diagram and a signalling diagram illustrating further embodiments of a method in a wireless communications network.

In some second embodiments the first network node 1511, which may be a Pico eNB, may operate as shown in FIG. 17. The initial procedures for detection of harmful interference levels are the same as in the first embodiment. The difference is that rather than triggering two handover procedures, the first to move the control plane from source cell to target cell and the second to move the user plane from the target cell to the source cell, i.e. to perform the UL-DL split, only one procedure is carried out. In this single procedure embodiment the control plane is shifted from the source eNB, such as the first network node 1511, to the target eNB, such as the second network node 1512, and at the same time the UL-DL split is achieved. In other words a single procedure is used to move the control plane anchor to the target eNB and to indicate the handover of only the DL part or the UL part from the source eNB to the target eNB.

In some alternative embodiments the first actions relating to evaluation of ABS are omitted and the first network node 1511 instead directly requests the UL-DL split for the UE affected by DL interference, e.g. the user equipment 1521.

Figure 18:
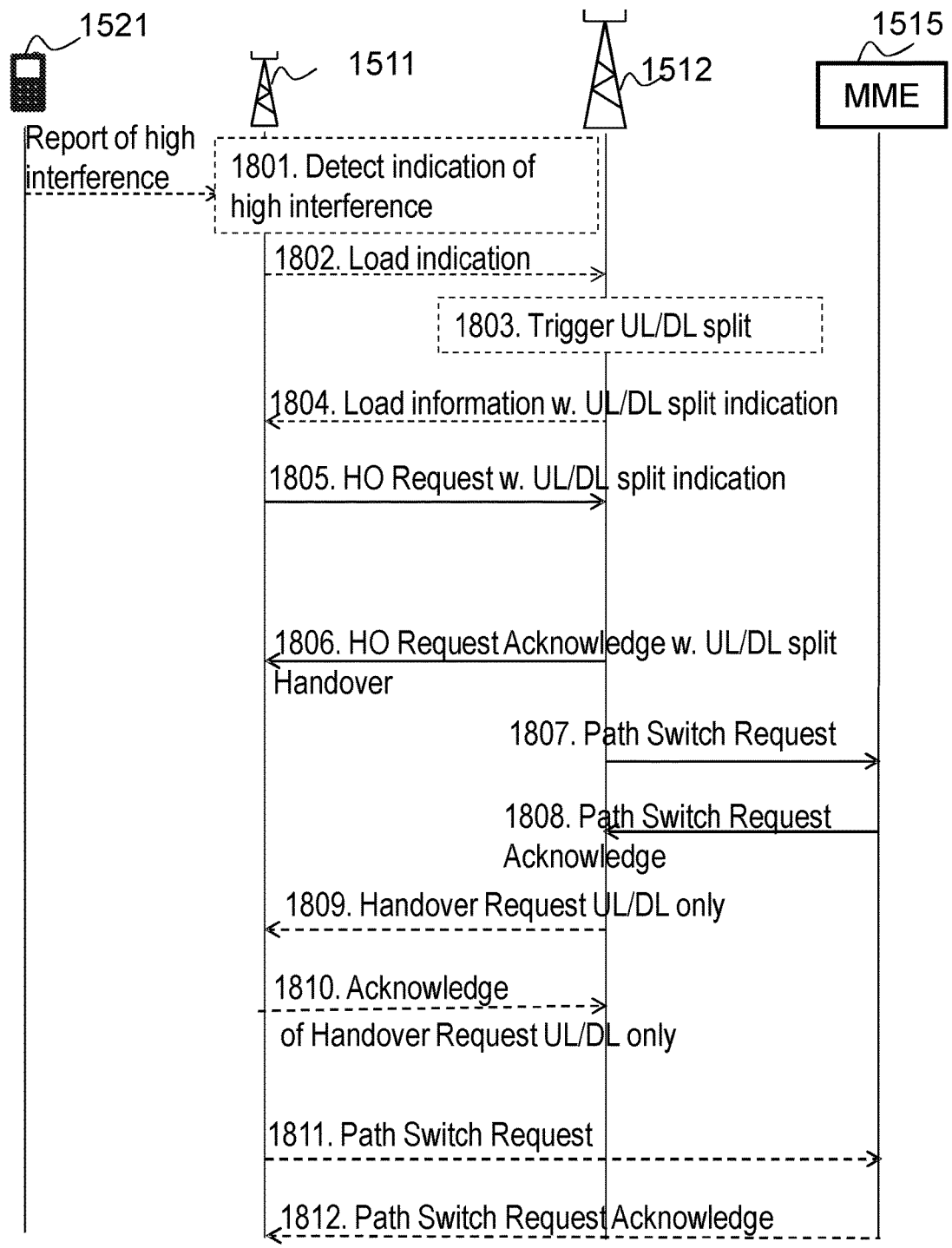
FIG. 18 is a signaling diagram illustrating embodiments in a wireless communications network.

Actions for splitting of the DL part and the UL part of the radio bearer between the first cell 1531 and the second cell 1532 will now be described with reference to a combined flowchart and signalling diagram depicted in FIG. 18.

As mentioned above, the first network node 1511 communicates with the user equipment 1521, in the first cell 1531.

In some embodiments the first network node 1511 also serves the second cell 1532, i.e. it may communicate with user equipments in the second cell 1532. Some of the following messaging is then performed within the first network node 1511. For example, the handover request is then transmitted within the first network node 1511 and the handover request acknowledge is received from within the first network node 1511.

Action 1801

The first network node 1511 may detect that the user equipment 1521 is affected by interference above a threshold level, which interference may be harmful.

The first network node 1511 may monitor the measurements from UEs, such as the user equipment 1521, in the CRE area. Such measurements may reveal high DL interference, as in the first scenario, or high UL interference, as in the second scenario. For the sake of simplicity assume a case of high DL interference.

Action 1802

In some embodiments the first network node transmits a request to the second network node 1512 to allocate ABS as a consequence of the detected interference in action 1801.

For example, the first network node 1511 may invoke the LOAD INDICATION procedure, asking for the allocation of ABS subframes, i.e. Invoke Indication is set to "ABS Information".

In the current X2 protocol specified in 3GPP TS 36.423 a procedure is specified for exchange of load information. The procedure is used for reporting a number of parameters concerning interference, as well as to invoke the allocation of subframes protected from interference, i.e. ABS.

A network node, e.g. an eNB, receiving this message may learn about the UL interference experienced by the neighbour cell of another network node sending the message, which may be done via the UL Interference Overload Indication IE. Alternatively, a network node experiencing high DL interference from a neighbour network node's cell may send this message to the neighbour network node, setting an Invoke Information IE to "ABS Information". The receiving network node will then ensure that in certain subframes no interference is generated. This means that the receiving network node will limit its DL transmissions in said subframes with consequent limitation in resource utilization and loss in overall cell capacity. The allocated subframes will then be sent to the eNB that sent the LOAD INFORMATION message as part of the ABS Information IE.

Action 1803

When the second network node 1512 have received a request to allocate ABS the second network node 1512 may evaluate if it is opportune to allocate ABS or if an UL/DL split procedure shall be triggered. The second network node 1512 may decide that a DL/UL split procedure shall be triggered.

Action 1804

The second network node 1512 may send a LOAD INFORMATION message back to the first network node 1511, indicating that an UL/DL split procedure shall be initiated for the UEs affected by high DL interference, e.g. the user equipment 1521. This may be indicated by the addition of a new IE, for example named UL-DL Split Indication. The new IE may be added to the LOAD INFORMATION message. The UL-DL Split Indication message may comprise enumerated information such as true. True may indicate that UL-DL split procedures may be triggered for the reporting cell, which is the second cell 1532 in this case.

Action 1805

The first network node 1511 triggers an X2: HANDOVER REQUEST for the UE affected by DL interference, e.g. the user equipment 1521.

The X2: HANDOVER REQUEST message may include a new IE indicating whether UL-DL split shall be performed between source and target cell, i.e. between the first cell 1531 and the second cell 1532, for the UE handed over. This new IE may be the same as the UL-DL Split Indication IE mentioned above. The X2: HANDOVER REQUEST message may include a new value in an existing IE, indicating whether UL-DL split shall be performed between source and target cell.

In some embodiments, for example the second embodiment mentioned above, the X2: HANDOVER REQUEST message may be enhanced with a per bearer indication of UL-DL split. The indication may for example be comprised in an IE, such as an UL-DL Split Handover IE. This IE message specifies that the UE control plane needs to be moved to the target eNB, i.e. the second network node 1512, but that for the bearers where the UL-DL Split Indication is provided, the UL or DL bearer traffic needs to be terminated with the source eNB, i.e. the first network node 1511. The X2: HANDOVER REQUEST message may further comprise a list of bearers for which handover of the DL part or the UL part only shall be performed.

The UL-DL Split Handover IE may comprise enumerated information. The values of the enumerated information may for example be UL, DL, no split. The modified X2: HANDOVER REQUEST message may be similar to the X2: HANDOVER REQUEST message mentioned above in relation to the first embodiment. However, the UL-DL Split Indication IE may be omitted because the UL-DL Split Indication IE mainly serves the purpose of indicating during a first handover procedure, performed to switch control plane from source to target, that UL-DL split procedures need to follow. However, in this embodiment there is only one handover procedure where the presence of the UL-DL Split Indication IE implies that control plane needs to be switched from source eNB to target eNB but that the UL part and the DL part of the radio bearer need to be split according to the per bearer indication provided in the handover messages. Note that the UL-DL Split Handover IE may also be included once, e.g. as part of the UE Context Information, for all bearers. Namely, rather than per bearer, the UL-DL Split Handover IE may be included once and indicate UL-DL split for all bearers.

Action 1806

The second network node 1512 replies with the X2: HANDOVER REQUEST ACKNOWLEDGE in case the UL-DL split procedure may be carried out. The admission of the split may be indicated in an IE, such as the UL-DL Split Handover IE used in action 1805 for the X2: HANDOVER REQUEST ACKNOWLEDGE message. Such an IE may indicate whether the UL only or the DL only or no split shall be performed.

In the first embodiment the handover acknowledge indicates admission of handover of full radio bearers, while in the second embodiment the handover acknowledge indicates admission of handover of only the UL part or the DL part of the radio bearers. A list of bearers for which the handover of only the DL part or the UL part is confirmed or failed may be included in the handover acknowledge If the procedure cannot be carried out, e.g. if UL-DL split is no more available, an X2: HANDOVER FAILURE may be sent. A new cause value may be added to the X2: HANDOVER FAILURE message. The new cause value may indicate that the relocation failed because the UL-DL split procedures are not possible.

Action 1807

In some embodiments, corresponding to the first embodiment, the second network node 1512 sends a PATH SWITCH REQUEST message to the core network node 1513, e.g. the MME, to indicate full user plane transfer for the bearers handed over.

In some other embodiments, corresponding to the second embodiment, the target eNB, i.e. the second network node 1512 in the second embodiment, sends a PATH SWITCH REQUEST message to the core network node 1513, e.g. the MME, to indicate switching of only one of the UL path or the DL path, i.e. to indicate that either the UL path switched to a "target eNB to MME" path or that the DL path switched to a "MME to target eNB" path. This may be achieved by adding the UL-DL Split Handover IE in the PATH SWITCH REQUEST message.

Upon receiving the PATH SWITCH REQUEST message the MME will understand what part of the bearer traffic has been handed over to the eNB sending the message. If UL bearer traffic was handed over for a particular bearer then the UL-DL Split Handover IE will be set to "UL". If DL bearer traffic was handed over for the particular bearer then the UL-DL Split Handover IE will be set to "DL". Optionally, if no split was performed for the particular bearer, the UL-DL Split Handover IE may be set to "No split" and no changes in the configuration of such bearers shall be applied, i.e. these bearers will keep the configuration already established with the source eNB.

If the MME receives an indication that one or more bearers have been switched in UL, then the MME shall ignore the Downlink GPRS Tunnelling Protocol Tunnel Endpoint Identifier (DL GTP-TEID) and Transport Layer Address indicated in the PATH SWITCH REQUEST, because DL traffic has not been switched. Namely the DL GTP-TEID, and Transport Layer Address and bearer configuration in DL already established with the source will be kept. The MME shall reply with new UL GTP-TEID and optionally with new Transport Layer Address, for the bearers where UL traffic has been switched, in the PATH SWITCH ACKNOWLEDGE message, and the second network node 1512 shall consider these new UL GTP-TEIDs and Transport Layer Address as the valid ones.

If the core network node 1513 receives indication that one or more bearers have been switched in DL, then the MME shall take the new DL GTP-TEID and Transport Layer Address indicated in the PATH SWITCH REQUEST message as the valid ones for DL traffic of the indicated bearers. For these bearers the MME shall not change the UL GTP-TEID and Transport Layer Address indicated in the PATH SWITCH ACKNOWLEDGE because UL traffic has not been switched. Namely the UL GTP-TEID, Transport Layer Address and bearer configuration in UL already established with the source will be kept.

Action 1808

In embodiments corresponding to the first embodiment the core network node 1513 replies to the second network node 1512 with a PATH SWITCH ACKNOWLEDGE message indicating full user plane transfer for the bearers handed over in the first handover from the first cell 1531 to the second cell 1532.

In embodiments corresponding to the second embodiment the core network node 1513, e.g. the MME, replies to the second network node 1512 with a PATH SWITCH ACKNOWLEDGE message following the behaviour described above in action 1807. Namely, for those bearers where UL switch was indicated the core network node 1513 shall assign new UL GTP-TEIDs and optionally change Transport Layer Address. For each bearer, the UL-DL Split Handover IE is set in the same way as it was set in the PATH SWITCH REQUEST.

Action 1809

In some embodiments the second network node 1512 triggers an X2: HANDOVER REQUEST to enable the UL-DL split for some or all the bearers of the user equipment 1521. The X2: HANDOVER REQUEST message may be modified to include the DL-UL split IEs, including the UL-DL Split Indication IE mentioned above and in FIG. 16 and in FIG. 17. Note that the UL-DL Split Handover IE may also be included once, e.g. as part of the UE Context Information, for all bearers. Namely, rather than per bearer, the UL-DL Split Handover IE may be included once and indicate UL-DL split for all bearers.

Action 1810

The first network node 1511 may reply with an X2: HANDOVER REQUEST ACKNOWLEDGE if the second handover may be admitted. Optionally an indication may be provided on a per bearer basis, providing information about the type of split applied and whether the split was not possible, i.e. the bearer has been relocated for both UL and DL. Alternatively an X2: HANDOVER FAILURE may be issues with a specific cause value indicating that UL-DL split cannot be performed.

Action 1811

In some embodiments, corresponding to the first embodiment, the first network node 1511 sends a PATH SWITCH REQUEST message to the MME to indicate switching of only one of the UL path or the DL path. The PATH SWITCH REQUEST message indicate changes of TEIDs for the target eNB, i.e. the first network node 1511.

This message may be sent as described above in action 1807.

Action 1812

In the embodiments corresponding to the first embodiment the core network node 1513, e.g. the MME, may reply to the message sent from the first network node 1511 in action 1811 with a PATH SWITCH ACKNOWLEDGE message following the behaviour described above in action 1808. The PATH SWITCH ACKNOWLEDGE message indicates switching of only one of the UL path or the DL path. The PATH SWITCH ACKNOWLEDGE message indicate changes of TEIDs for the target eNB, i.e. the first network node 1511.

Figure 19:
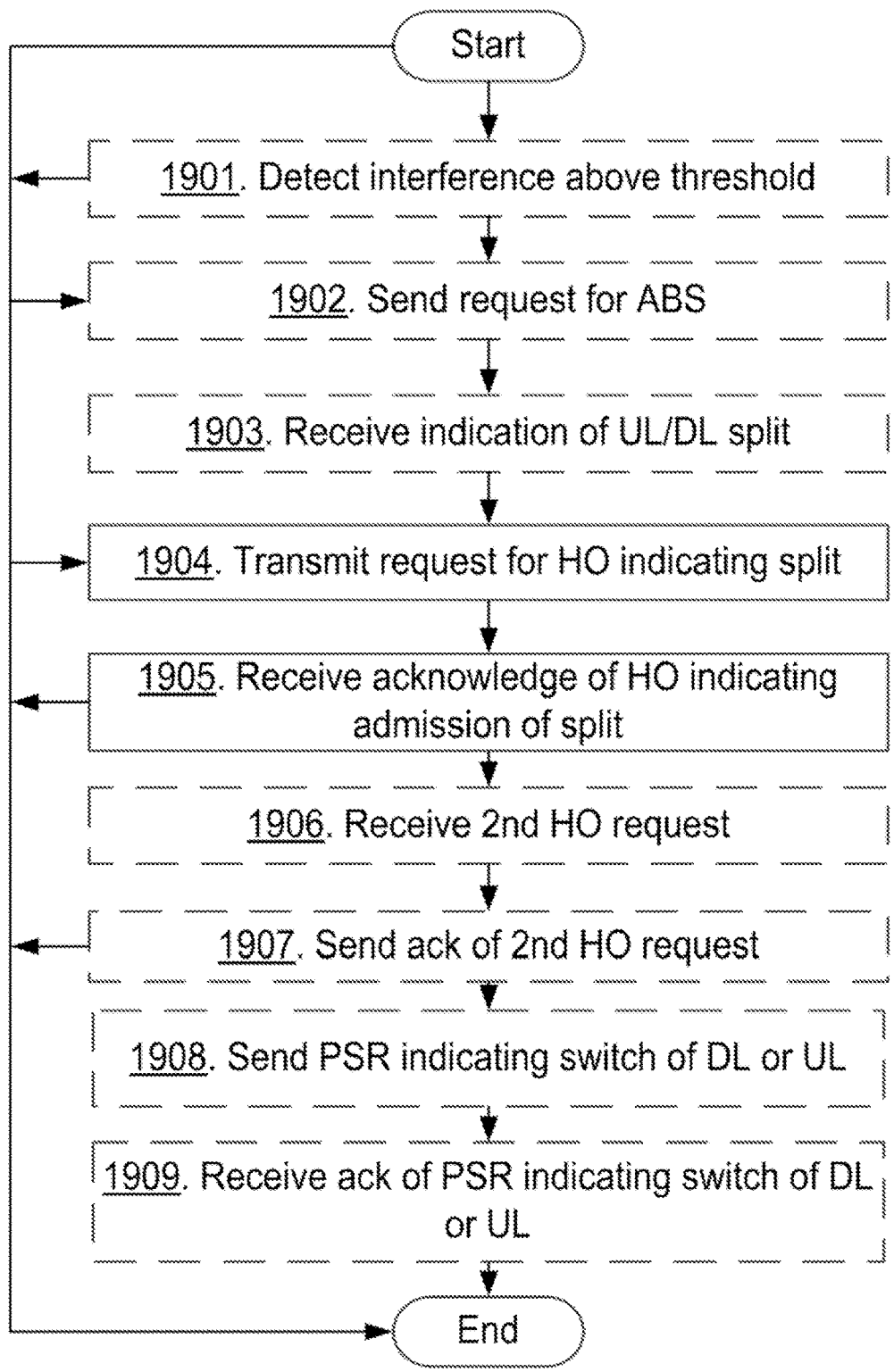
FIG. 19 is a flowchart depicting embodiments of a method in a first network node.

A method will now be described from a perspective of the first network node 1511. Thus, embodiments of a method in the first network node 1511 for splitting of the DL part and the UL part of the radio bearer between the first cell 1531 and the second cell 1532 in the wireless communications network 1500 will be described with reference to a flowchart depicted in FIG. 19.

As mentioned above, the first network node 1511 communicates with the user equipment 1521, in the first cell 1531.

In some embodiments the first network node 1511 also serves the second cell 1532 and may replace the second network node 1512. When the second cell 1532 is served by the first network node 1511 the handover request is transmitted within the first network node 1511 and the handover request acknowledge is received from within the first network node 1511.

Action 1901

The first network node 1511 may detect that the user equipment 1521 is affected by interference above a threshold level. The interference may be categorized as high and/or harmful. This action relates to action 1801.

Action 1902

In some embodiments the first network node 1511 transmits a request to the second network node 1512 to allocate ABS as a consequence of the detected interference. This action relates to action 1802 and to action 2101 below.

Action 1903

The first network node 1511 may receive from the second network node 1512, in response to the request to allocate ABS, an indication that the splitting of the DL part and the UL part shall be initiated. This action relates to action 1804 above.

Action 1904

The first network node 1511 transmits a handover request. The handover request indicates splitting of the DL part and the UL part of the radio bearer between the first cell 1531 and the second cell 1532.

In some embodiments the handover request indicates the splitting by indicating the handover of only one of the UL or the DL part of the radio bearer, between the first cell 1531 and the second cell 1532.

In some other embodiments the handover request indicates the splitting by indicating the first handover of both the DL and the UL part of the radio bearer between the first cell 1531 and the second cell 1532, and by indicating a second handover of only one of the DL part or the UL part of the radio bearer from between the second cell 1532 to and the first cell 1531.

When the second cell 1532 is served by the second network node 1512 the handover request is transmitted to the second network node 1512 and the handover request acknowledge is received from the second network node 1512.

When the second cell 1532 is served by the first network node 1511 then the handover request is transmitted within the first network node 1511 and the handover request acknowledge is received from within the first network node 1511.

This action relates to action 1805 above and to action 2104 below.

Action 1905

The first network node 1511 receives a handover request acknowledge of the handover request, which handover request acknowledge indicates admission of the splitting.

In some embodiments the handover request acknowledge is received from the second network node 1512.

The handover request acknowledge may be received from the first network node 1511.

In some embodiments the handover request acknowledge indicates admission of the splitting by indicating admission of handover of only one of the UL part or the DL part of the radio bearer between the first cell 1531 and the second cell 1532.

In some other embodiments, corresponding to the first embodiment mentioned above, the handover request acknowledge indicates admission of the splitting by indicating admission of the first handover of both the UL part and the DL part of the radio bearer between the first cell 1531 and the second cell 1532.

This action relates to action 1806 above and action 2105 below.

Action 1906

The handover request sent in action 1904 may have indicated the splitting by indicating the first handover of both the DL and the UL part of the radio bearer between the first cell 1531 and the second cell 1532, and by indicating the second handover of only one of the DL part or the UL part of the radio bearer between the second cell 1532 and the first cell 1531. Then the first network node 1511 may receive the second handover request. The second handover request indicates handover of only one of the UL part or the DL part of the radio bearer between the second cell 1531 and the first cell 1532.

This action relates to action 1809 above and action 2108 below.

Action 1907

In response to the second handover request received in action 1906 the first network node 1511 may transmit the handover request acknowledge of the second handover request. The handover request acknowledge of the second handover request indicates admission of handover of only one of the UL part or the DL part of the radio bearer, between the second cell 1531 and the first cell 1532.

This action relates to action 1810 above and action 2109 below.

Action 1908

In some embodiments, e.g. in the first embodiment mentioned above, the first network node 1511 transmits to the core network node 1513, a path switch request. The path switch request indicates user plane switch of only one of the DL part or the UL part of the radio bearer between the second cell 1532 and the first cell 1531.

This action relates to action 1811 above.

Action 1909

The first network node 1511 may receive from the core network node 1513 an acknowledge of the path switch request received in action 1908. The acknowledge of the path switch request indicates user plane switch of only one of the UL part or the DL part of the radio bearer between the second cell 1532 and the first cell 1531.

This action relates to action 1812 above.

Figure 20:
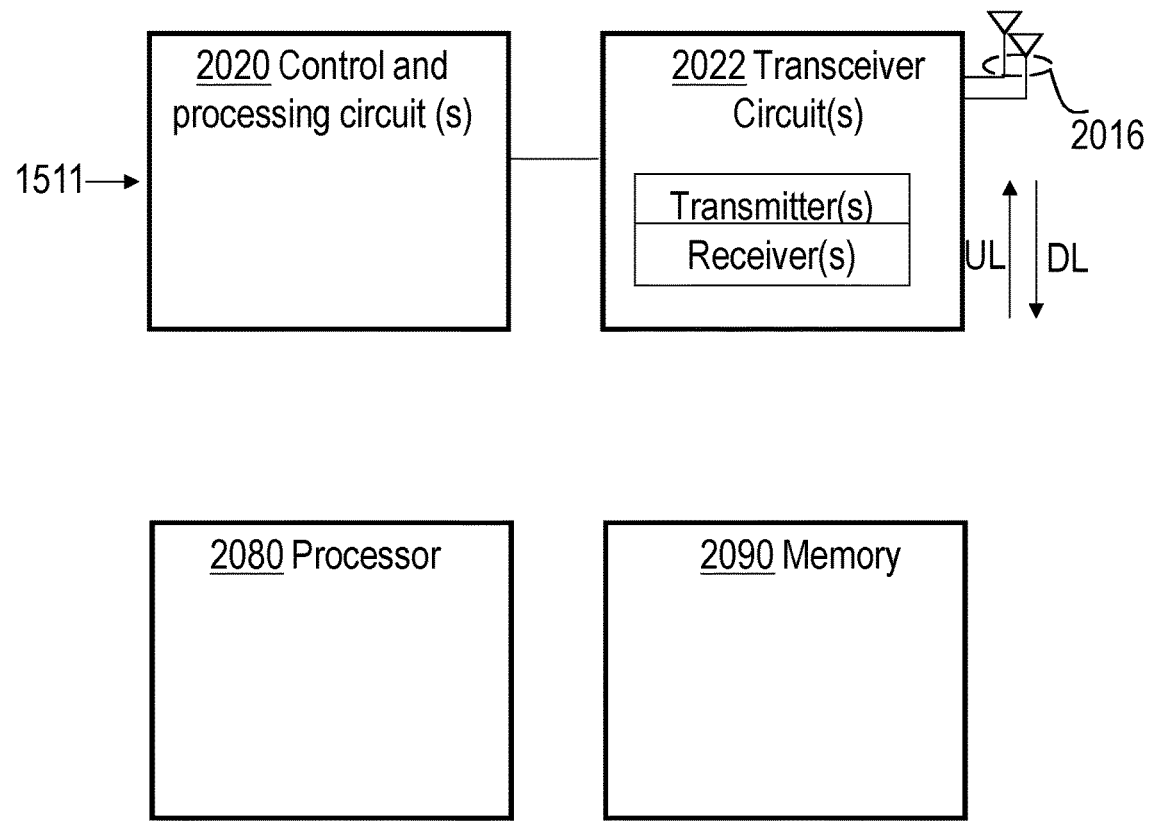
FIG. 20 is a schematic block diagram illustrating embodiments of a first network node.

To perform the method actions for splitting of the DL and the UL part of the radio bearer between the first cell 1531 and the second cell 1532 in the wireless communications network 1500 described above in relation to FIG. 19, the first network node 1511 comprises the following arrangement depicted in FIG. 20. As mentioned above, the first network node 1511 is adapted to communicate with the user equipment 1521 arranged to be located in the first cell 1531.

In some embodiments the first network node 1511 is further adapted to communicate with user equipments in the second cell 1532, i.e. the first network node 1511 may be adapted to serve both the first cell 1531 and the second cell 1532. Then the first network node 1511 is adapted to transmit the handover request within the first network node 1511 and to receive the handover request acknowledge from within the first network node 1511.

The first network node 1511 comprises a control and processing circuit 2020 and a transceiver circuit 2022. The control and processing circuit 2020 and the transceiver circuit 2022 are adapted to transmit the handover request, which handover request indicates splitting of the DL part and the UL part of the radio bearer between the first cell 1531 and the second cell 1532.

The processing circuit 2020 and the transceiver circuit 2022 may further be adapted to receive the handover request acknowledge of the handover request, which handover request acknowledge indicates admission of the splitting.

In some embodiments the handover request indicates the splitting by indicating the handover of only one of the UL part or the DL part of the radio bearer, between the first cell 1531 and the second cell 1532. Then the handover request acknowledge indicates admission of the splitting by indicating admission of handover of only one of the UL part or the DL part of the radio bearer between the first cell 1531 and the second cell 1532.

In some other embodiments the handover request indicates the splitting by indicating the first handover of both the DL part and the UL part of the radio bearer between the first cell 1531 and the second cell 1532, and by indicating the second handover of only one of the DL part or the UL part of the radio bearer between the second cell 1532 and the first cell 1531. Then the control and processing circuit 2020 and the transceiver circuit 2022 are further adapted to:

receive the second handover request, which second handover request indicates handover of only one of the UL part or the DL part of the radio bearer, between the second cell 1531 and the first cell 1532, transmit the handover request acknowledge of the second handover request, which handover request acknowledge of the second handover request indicates handover of only one of the UL part or the DL part of the radio bearer, between the second cell 1531 and the first cell 1532, transmit to the core network node 1513, the path switch request, which path switch request indicates user plane switch of only one of the DL part or the UL part of the radio bearer between the second cell 1532 and the first cell 1531, and receive from the core network node 1513 the acknowledge of the path switch request, which acknowledge of the path switch request indicates user plane switch of only one of the UL part or the DL part of the radio bearer between the second cell 1532 and the first cell 1531.

The control and processing circuit 2020 and the transceiver circuit 2022 may further be adapted to detect that the user equipment 1521 is affected by interference above the threshold level. Such interference may be categorised as high and/or harmful.

In some embodiments the control and processing circuit 2020 and the transceiver circuit 2022 are further adapted to transmit the request to allocate Almost Blank Subframes, ABS, and in response to the request to allocate ABS, receive an indication that the splitting of the DL and UL part shall be initiated.

The first network node 1511 may further comprise one or more antennas 2016 for radio communication with for example the user equipment 1521.

The embodiments herein for splitting of the DL part and the UL part of the radio bearer between the first cell 1531 and the second cell 1532 in the wireless communications network 1500 may be implemented through one or more processors, such as a processor 2080 in the first network node 1511, depicted in FIG. 20, together with computer program code for performing the functions and actions of the embodiments herein. The program code mentioned above may also be provided as a computer program product, for instance in the form of a data carrier carrying computer program code for performing the embodiments herein when being loaded into the first network node 1511. One such carrier may be in the form of a CD ROM disc. It is however feasible with other data carriers such as a memory stick. The computer program code may furthermore be provided as pure program code on a server and downloaded to the first network node 1511.

The first network node 1511 may further comprise a memory 2090 comprising one or more memory units. The memory 2090 is arranged to be used to store for example indications, cell parameters, configurations, and applications to perform the methods herein when being executed in the first network node 1511.

Those skilled in the art will also appreciate that the control and processing circuit 2020 and the transceiver circuit 2022 described above may refer to a combination of analogue and digital circuits, and/or one or more processors configured with software and/or firmware, e.g. stored in a memory, that when executed by the one or more processors, such as the processor 2080, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Figure 21:
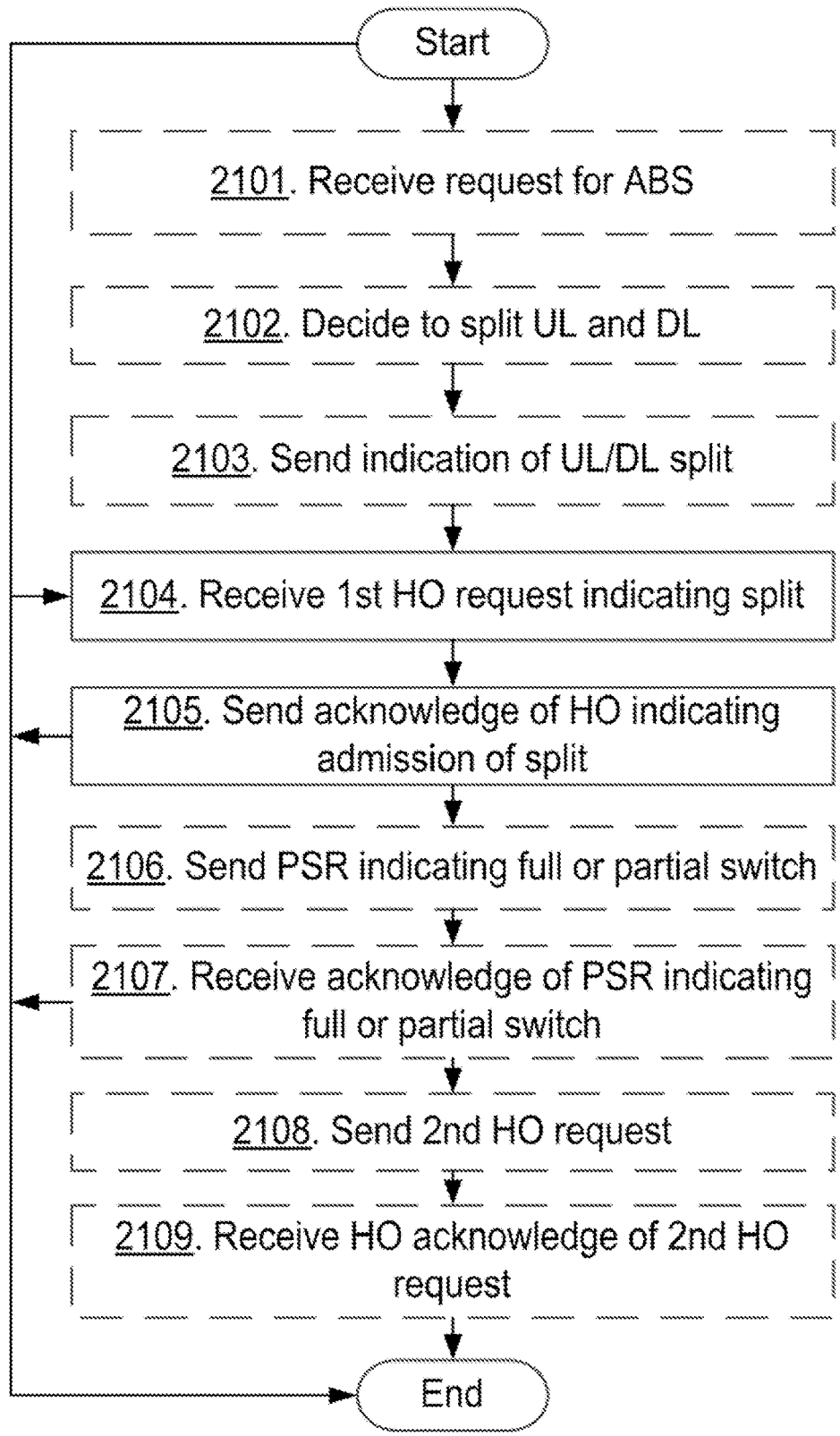
FIG. 21 is a flowchart depicting embodiments of a method in a second network node.

A method will now be described from a perspective of the second network node 1512. Thus, embodiments of a method in the second network node 1512 for splitting of the DL part and the UL part of the radio bearer between the first cell 1531 and the second cell 1532 in the wireless communications network 1500 will be described with reference to a flowchart depicted in FIG. 21.

As mentioned above, the first network node 1511 communicates with the user equipment 1521, in the first cell 1531. The second network node 1512 serves user equipment in the second cell 1532.

In some embodiments the second network node 1512 also serves the first cell 1531 and may replace the first network node 1511. In other words, the second network node 1512 is the same network node as the first network node 1511. When the first cell 1531 is served by the second network node 1512 the handover request is transmitted within the second network node 1512 and the handover request acknowledge is received from within the second network node 1512.

Action 2101

In some embodiments the second network node 1512 receives from the first network node 1511 the request to allocate ABS.

This action relates to action 1802 and 1902 above.

Action 2102

When the second network node 1512 have received the request to allocate ABS the second network node 1512 may decide to trigger the splitting of the DL part and the UL part of the radio bearer between the first cell 1531 and the second cell 1532, based on the request to allocate ABS.

This action relates to action 1803.

Action 2103

In some embodiments the second network node 1512 transmits to the first network node 1511, in response to the request to allocate ABS, the indication that the splitting of the DL part and the UL part of the radio bearer between the first cell 1531 and the second cell 1532 shall be initiated.

This action relates to action 1804 and 1903 above.

Action 2104

The second network node 1512 receives the handover request, which handover request indicates splitting of the DL part and the UL part of the radio bearer between the first cell 1531 and the second cell 1532.

The handover request may indicate the splitting by indicating handover of only one of the DL part or the UL part of the radio bearer between the first cell 1531 and the second cell 1532.

In some embodiments the handover request indicates the splitting by indicating the first handover of both the DL part and the UL part of the radio bearer between the first cell 1531 and the second cell 1532 and by indicating the second handover of only one of the DL part or the UL part of the radio bearer between the second cell 1532 and the first cell 1531.

When the first cell 1531 is served by the second network node 1512 the handover request is transmitted to the first network node 1511 and the handover request acknowledge is received from the first network node 1511.

When the first cell 1531 is served by the second network node 1512 then the handover request is transmitted within the second network node 1512 and the handover request acknowledge is received from within the second network node 1512.

This action relates to action 1805 and 1904 above.

Action 2105

The second network node 1512 transmits the handover request acknowledge in response to the handover request, which handover request acknowledge indicates admission of the splitting.

The handover request acknowledge may indicate admission of the splitting by indicating admission of only one of the DL part or the UL part of the radio bearer between the first cell 1531 and the second cell 1532.

This action relates to action 1806 and 1905 above.

Action 2106

In some embodiments the second network node 1512 transmits to the core network node 1513, the path switch request requesting user plane switch of only one of the DL part or the UL part of the radio bearer between the first cell 1531 and the second cell 1532.

In some other embodiments the handover request received in action 2014 have indicated the splitting by indicating the first handover of both the DL and the UL part of the radio bearer between the first cell 1531 and the second cell 1532 and by further indicating the second handover of only one of the DL part or the UL part of the radio bearer between the second cell 1532 and the first cell 1531. Then the second network node 1512 may transmit to the core network node 1513, the path switch request requesting user plane switch for both the DL part and the UL part of the radio bearer for which handover of the DL part and the UL part has been indicated.

This action relates to action 1807 above.

Action 2107

The second network node 1512 may receive from the core network node 1513 an acknowledge of the path switch request, requesting user plane switch of only one of the DL part or the UL part of the radio bearer between the first cell 1531 and the second cell 1532. The acknowledge indicates user plane switch of only one of the UL or the DL part of the radio bearer between the first cell 1531 and the second cell 1532.

In some embodiments the second network node 1512 receives from the core network node 1513 an acknowledge of the path switch request, which acknowledge of the path switch request indicates user plane switch for both the DL part and the UL part of the radio bearer for which handover of both the DL part and the UL part has been indicated.

This action relates to action 1808 above.

Action 2108

The second network node 1512 may transmit the second handover request to the first network node 1511, which second handover request indicates handover of only one of the UL or the DL part of the radio bearer, between the second cell 1531 and the first cell 1532. This is done when the handover request have indicated the splitting by indicating the first handover of both the DL and the UL part of the radio bearer between the first cell 1531 and the second cell 1532 and by further indicating the second handover of only one of the DL part or the UL part of the radio bearer between the second cell 1532 and the first cell 1531.

This action relates to action 1809 and 1906 above.

Action 2109

In some embodiments the second network node 1512 receives the handover request acknowledge of the second handover request. The handover request acknowledge of the second handover request indicates admission of handover of only one of the UL part or the DL part of the radio bearer, between the second cell 1532 and the first cell 1531.

This action relates to action 1810 and 1907 above.

Figure 22:
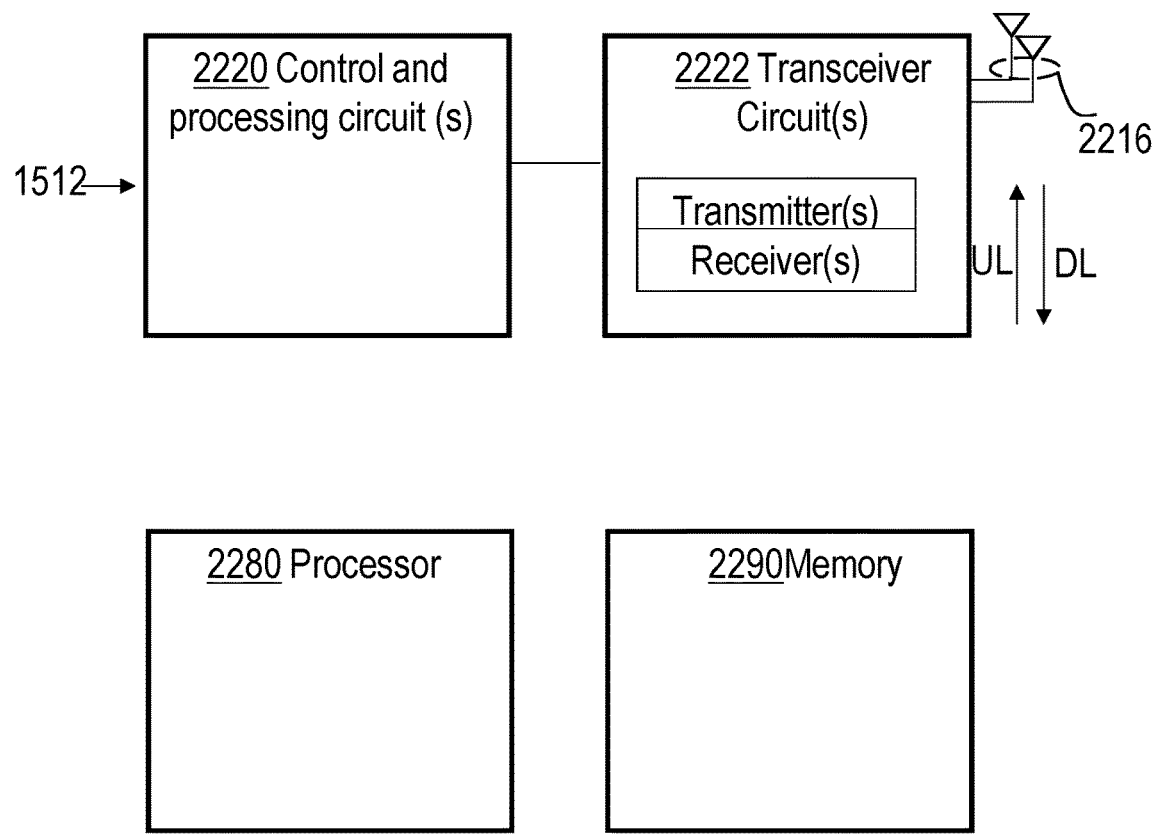
FIG. 22 is a schematic block diagram illustrating embodiments of a second network node.

To perform the method actions for splitting of the DL and the UL part of the radio bearer between the first cell 1531 and the second cell 1532 in the wireless communications network 1500 described above in relation to FIG. 21, the second network node 1512 comprises the following arrangement depicted in FIG. 22. As mentioned above, the first network node 1511 is arranged to communicate with the user equipment 1521 arranged to be located in the first cell 1531. The first cell 1531 is served by the first network node 1511. The second network node 1512 is arranged to serve the second cell 1532.

In some embodiments the second network node 1512 also serves the first cell 1531 and may replace the first network node 1511. In other words, the second network node 1512 may be the same network node as the first network node 1511. When the first cell 1531 is served by the second network node 1512 the handover request is transmitted within the second network node 1512 and the handover request acknowledge is received from within the second network node 1512.

The second network node 1512 comprises a control and processing circuit 2220 and a transceiver circuit 2222. The control and processing circuit 2220 and the transceiver circuit 2222 are adapted to receive the handover request. The handover request indicates splitting of the DL part and the UL part of the radio bearer between the first cell 1531 and the second cell 1532. The control and processing circuit 2220 and the transceiver circuit 2222 may further be adapted to transmit to the first network node 1511, the handover request acknowledge in response to the handover request, which handover request acknowledge indicates admission of the handover.

In some embodiments the handover request indicates the splitting by indicating handover of only one of the DL part or the UL part of the radio bearer between the first cell 1531 and the second cell 1532, and the handover request acknowledge indicates admission of the splitting of the DL part and the UL part of the radio bearer between the first cell 1531 and the second cell 1532.

The control and processing circuit 2220 and the transceiver circuit 2222 may further be adapted to:
  receive from the first network node 1511 the request to
    allocate Almost Blank Subframes, ABS, decide to trigger the splitting of the DL and the UL part of the radio bearer between the first cell 1531 and the second cell 1532, based on the request to allocate ABS, and transmit an indication to the first network node 1511 that the splitting of the DL and the UL part of the radio bearer between the first cell 1531 and the second cell 1532 shall be initiated.

The control and processing circuit 2220 and the transceiver circuit 2222 may be further adapted to:

transmit to the core network node 1513, the path switch request requesting user plane switch for both the DL and the UL part of the radio bearer for which handover of the DL and the UL part has been indicated, and receive from the core network node 1513 an acknowledge of the path switch request, which acknowledge of the path switch request indicates user plane switch for both the DL and the UL part of the radio bearer for which handover of the DL and the UL part has been indicated, and transmit the second handover request, which second handover request indicates handover of only one of the UL or the DL part of the radio bearer, between the second cell 1531 and the first cell 1532, and receive the handover request acknowledge of the second handover request, which handover request acknowledge of the second handover request indicates admission of handover of only one of the UL or the DL part of the radio bearer, between the second cell 1531 and the first cell 1532.

The control and processing circuit 2220 and the transceiver circuit 2222 may further be adapted to:

transmit to the core network node 1513, the path switch request requesting user plane switch of only one of the DL part or the UL part of the radio bearer between the first cell 1531 and the second cell 1532, and receive from the core network node 1513 an acknowledge of the path switch request, requesting user plane switch of only one of the DL part or the UL part of the radio bearer between the first cell 1531 and the second cell 1532. The acknowledge indicates user plane switch of only one of the UL part or the DL part of the radio bearer between the first cell 1531 and the second cell 1532.

The second network node 1512 may further comprise one or more antennas 2216 for radio communication with for example user equipment in the second cell 1532.

The embodiments herein for splitting of the DL part and the UL part of the radio bearer between the first cell 1531 and the second cell 1532 in the wireless communications network 1500 may be implemented through one or more processors, such as a processor 2280 in the second network node 1512, depicted in FIG. 22, together with computer program code for performing the functions and actions of the embodiments herein. The program code mentioned above may also be provided as a computer program product, for instance in the form of a data carrier carrying computer program code for performing the embodiments herein when being loaded into the second network node 1512. One such carrier may be in the form of a CD ROM disc. It is however feasible with other data carriers such as a memory stick. The computer program code may furthermore be provided as pure program code on a server and downloaded to the second network node 1512.

The second network node 1512 may further comprise a memory 2290 comprising one or more memory units. The memory 2290 is arranged to be used to store indications, metrics, determined measures of the downlink interference, cell parameters, configurations, and applications to perform the methods herein when being executed in the second network node 1512.

Those skilled in the art will also appreciate that the control and processing circuit 2220 and the transceiver circuit 2222 described above may refer to a combination of analogue and digital circuits, and/or one or more processors configured with software and/or firmware, e.g. stored in a memory, that when executed by the one or more processors such as the processor 2280 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Figure 23:
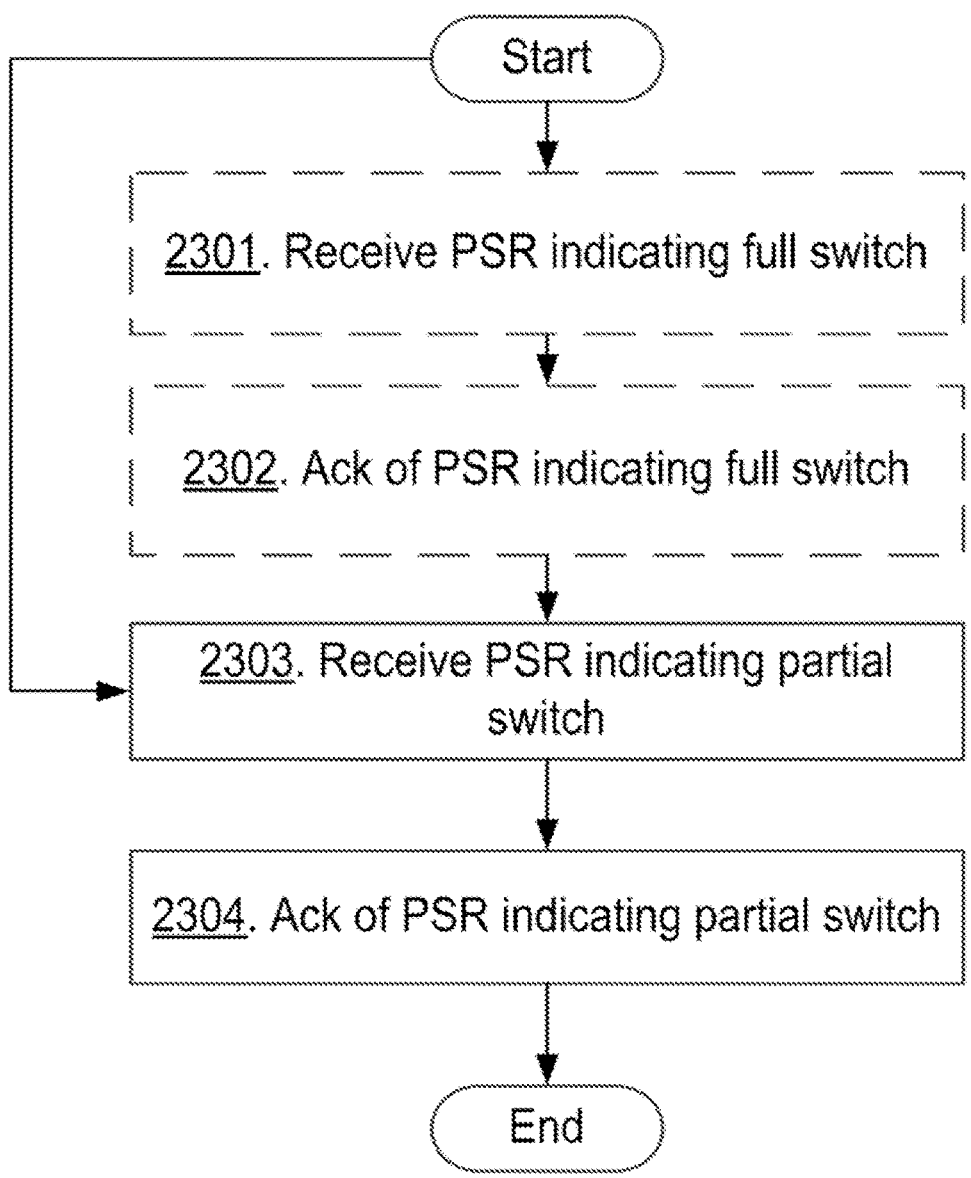
FIG. 23 is a flowchart depicting embodiments of a method in a core network node.

A method will now be described from a perspective of the core network node 1513. Thus, embodiments of a method in the core network node 1513 for splitting of the DL part and the UL part of the radio bearer between the first cell 1531 and the second cell 1532 in the wireless communications network 1500 will be described with reference to a flowchart depicted in FIG. 23.

As mentioned above, the first network node 1511 communicates with the user equipment 1521, in the first cell 1531. The second network node 1512 serves user equipment in the second cell 122.

The core network node 1513 is the control node that processes the signaling between the user equipment 1521 and the core network. The core network node 1513 may be an MME.

Action 2301

In some embodiments the core network node 1513 receives the first path switch request indicating user plane switch of both the DL part and the UL part of the radio bearer between the first cell 1531 and the second cell 1532. The first path switch request may be sent from the second network node 1512.

Action 2302

The core network node 1513 may transmit an acknowledge of the first path switch request, which acknowledge of the first path switch request indicates user plane switch of both the DL part and the UL part of the radio bearer between the first cell 1531 and the second cell 1532. The acknowledge of the first path switch request may be sent to the second network node 1512.

Action 2303

The core network node 1513 receives the second path switch request indicating user plane switch of only one of the DL part or the UL part of the radio bearer between the first cell 1531 and the second cell 1532. The second path switch request may be sent from the first network node 1511 or from the second network node 1512.

Action 2304

The core network node 1513 transmits an acknowledge of the second path switch request. The acknowledge of the second path switch request indicates user plane switch of only one of the DL part or the UL part of the radio bearer between the first cell 1531 and the second cell 1532. The second path switch request may be sent to the first network node 1511 or to the second network node 1512.

To perform the method actions for splitting of the DL and the UL part of the radio bearer between the first cell 1531 and the second cell 1532 in the wireless communications network 1500 described above in relation to FIG. 22, the core network node 1513 is adapted according to the description below.

As mentioned above, the first network node 1511 communicates with the user equipment 1521, in the first cell 1531. The second network node 1512 serves user equipment in the second cell 122.

The core network node 1513 is the control node that processes the signaling between the user equipment 1521 and the core network. The core network node 1513 may be an MME.

The core network node 1513 is adapted to:
receive a second path switch request indicating user plane switch of only one of the DL part or the UL part of the radio bearer between the first cell 1531 and the second cell 1532, and
transmit an acknowledge of the second path switch request, which acknowledge of the second path switch request indicates user plane switch of only one of the DL part or the UL part of the radio bearer between the first cell 1531 and the second cell 1532.

The core network node 1513 may further be adapted to:
receive a first path switch request indicating user plane switch of both the DL part and the UL part of the radio bearer between the first cell 1531 and the second cell 1532, and
transmit an acknowledge of the first path switch request, which acknowledge of the first path switch request indicates user plane switch of both the DL part and the UL part of the radio bearer between the first cell 1531 and the second cell 1532.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a first network node for splitting of a downlink (DL) part and an uplink (UL) part of a radio bearer between a first cell and a second cell in a wireless communications network, comprising:
associating the radio bearer, comprising the UL part and the DL part, for communication in the first cell between the first network node and a user equipment;
detecting that the user equipment is affected by interference above a threshold level in only one of the DL part and the UL part of the radio bearer;
in response to said detecting, transmitting a request to allocate Almost Blank Subframes (ABS) in the second cell;
receiving, in response to the request to allocate ABS in the second cell, an indication that splitting of the DL part and the UL part of the radio bearer between the first cell and the second cell shall be initiated, such that only the one of the DL part and the UL part is moved to the second cell;
transmitting a handover request indicating the splitting of the DL part and the UL part of the radio bearer;
receiving an acknowledgement of the handover request, the acknowledgement indicating admission of the splitting.

2. The method of claim 1, wherein the second cell is served by a second network node, the handover request is transmitted to the second network node, and the handover request acknowledgement is received from the second network node.

3. The method of claim 1, wherein the second cell is served by the first network node, the handover request is transmitted within the first network node, and the handover request acknowledgement is received from within the first network node.

4. The method of claim 1, wherein the handover request indicates a handover of only the one of the UL part and the DL part of the radio bearer from the first cell to the second cell, and wherein the acknowledgement indicates admission of handover of only the one of the UL part or the DL part of the radio bearer from the first cell to the second cell.

5. The method of claim 1, wherein the handover request indicates a first handover of both the DL part and the UL part of the radio bearer from the first cell to the second cell, and a second handover of only the other of the DL part or the UL part of the radio bearer from the second cell to the first cell, the method further comprising:
receiving a second handover request indicating handover of only the other of the UL part or the DL part of the radio bearer from the second cell to the first cell; and
transmitting an acknowledgement of the second handover request, the acknowledgement of the second handover request indicating admission of handover of only the other of the UL part or the DL part of the radio bearer, from the second cell to the first cell.

6. The method of claim 5, further comprising:
transmitting to a core network node, a path switch request, which path switch request indicates user plane switch of only the one of the DL part or the UL part of the radio bearer from the second cell to the first cell; and
receiving from the core network node an acknowledgement of the path switch request, the acknowledgement of the path switch request indicating user plane switch of only the one of the UL part or the DL part of the radio bearer from the second cell to the first cell.

7. A first network node adapted for splitting of a downlink (DL) and an uplink (UL) part of a radio bearer between a first cell and a second cell in a wireless communications network, comprising:
a transceiver circuit; and
a control and processing circuit coupled to the transceiver circuit and operable, in cooperation with the transceiver circuit, to:
associate the radio bearer, comprising the UL part and the DL part, for communication in the first cell between the first network node and a user equipment;
detect that the user equipment is affected by interference above a threshold level in only one of the DL part and the UL part of the radio bearer;
in response to said detection, transmit a request to allocate Almost Blank Subframes (ABS) in the second cell;
receive, in response to the request to allocate ABS in the second cell, an indication that splitting of the DL part and the UL part of the radio bearer between the first cell and the second cell shall be initiated, such that only the one of the DL part and the UL part is moved to the second cell;
transmit a handover request indicating the splitting of the DL part and the UL part of the radio bearer;
receive an acknowledgement of the handover request, the acknowledgement indicating admission of the splitting.

8. The first network node of claim 7, wherein the handover request indicates a handover of only the one of the UL part and the DL part of the radio bearer from the first cell to the second cell, and wherein the acknowledgement indicates admission of handover of only the one of the UL part or the DL part of the radio bearer from the first cell to the second cell.

9. The first network node of claim 7, wherein the handover request indicates a first handover of both the DL part and the UL part of the radio bearer from the first cell to the second cell, and a second handover of only the other of the DL part and the UL part of the radio bearer from the second cell to the first cell, and wherein the control and processing circuit is further operable to:
receive a second handover request indicating handover of only the other of the UL part or the DL part of the radio bearer, from the second cell to the first cell;
transmit an acknowledgement of the second handover request, the acknowledgement of the second handover request indicating handover of only the other of the UL part and the DL part of the radio bearer, from the second cell to the first cell;
transmit to a core network node, a path switch request indicating user plane switch of only the other of the DL part and the UL part of the radio bearer from the second cell to the first cell; and
receive from the core network node a path switch request acknowledgement indicating user plane switch of only the other of the UL part and the DL part of the radio bearer from the second cell to the first cell.

10. The first network node of claim 7, wherein the first network node is adapted to serve both the first cell and the second cell and the first network node is adapted to transmit the handover request within the first network node and to receive the handover request acknowledgement from within the first network node.

11. A method in a second network node for splitting of a downlink (DL) part and an uplink (UL) part of a radio bearer between a first cell and a second cell in a wireless communications network, wherein the radio bearer is associated to DL and UL transmissions between a first network node and a user equipment in the first cell, and wherein the second network node serves the second cell, the method comprising:
receiving a request to allocate Almost Blank Subframes (ABS), responsive to a detection that the user equipment is affected by interference above a threshold level in only one of the DL part and the UL part of the radio bearer;
deciding to trigger splitting of the DL part and the UL part of the radio bearer between the first cell and the second cell, such that only the one of the DL part and the UL part of the radio bearer is moved to the second cell;
transmitting, in response to the request to allocate ABS, an indication that the splitting of the DL part and the UL part of the radio bearer between the first cell and the second cell shall be initiated;
receiving a handover request indicating the splitting of the DL part and the UL part of the radio bearer between the first cell and the second cell; and
transmitting an acknowledgement in response to the handover request, the acknowledgement indicates admission of the splitting.

12. The method of claim 11, wherein the handover request indicates a handover of only the one of the UL part and the DL part of the radio bearer from the first cell to the second cell, and wherein the acknowledgement indicates admission of handover of only the one of the UL part or the DL part of the radio bearer from the first cell to the second cell.

13. The method of claim 12, further comprising:
transmitting to a core network node, a path switch request requesting user plane switch of only the one of the DL part or the UL part of the radio bearer from the first cell to the second cell; and
receiving from the core network node an acknowledgement of the path switch request, the acknowledgement requesting user plane switch of only the one of the DL part or the UL part of the radio bearer from the first cell to the second cell, which acknowledge indicates user plane switch of only the one of the UL or the DL part of the radio bearer from the first cell to the second cell.

14. The method of claim 11, wherein the handover request indicates a first handover of both the DL part and the UL part of the radio bearer from the first cell to the second cell and a second handover of only the other of the DL part or the UL part of the radio bearer from the second cell to the first cell, the method further comprising:
transmitting to a core network node, a path switch request requesting user plane switch for both the DL part and the UL part of the radio bearer in relation to the indicated first handover;
receiving from the core network node an acknowledgement of the path switch request, the acknowledgement of the path switch request indicating user plane switch for both the DL part and the UL part of the radio bearer in relation to the indicated first handover;
transmitting a second handover request indicates handover of only the other of the UL or the DL part of the radio bearer, from the second cell to the first cell; and
receiving an acknowledgement of the second handover request, the acknowledgement of the second handover request indicating admission of handover of only the other of the UL part or the DL part of the radio bearer, from the second cell to the first cell.

15. The method of claim 11, wherein the second network node is the same network node as the first network node, and serves both the first cell and the second cell.

16. A second network node adapted for splitting of a downlink (DL) part and an uplink (UL) part of a radio bearer between a first cell and a second cell in a wireless communications network, wherein the radio bearer is associated to DL and UL transmissions between a first network node and a user equipment arranged to be located in the first cell, and wherein the second network node serves the second cell, the second network node comprising:
a transceiver circuit; and
a control and processing circuit coupled to the transceiver circuit and operable to:
receive a request to allocate Almost Blank Subframes (ABS), responsive to a detection that the user equipment is affected by interference above a threshold level in only one of the DL part and the UL part of the radio bearer;
decide to trigger splitting of the DL part and the UL part of the radio bearer between the first cell and the second cell, such that only the one of the DL part and the UL part of the radio bearer is moved to the second cell;
transmit, in response to the request to allocate ABS, an indication that the splitting of the DL part and the UL part of the radio bearer between the first cell and the second cell shall be initiated;

receive a handover request indicating the splitting of the DL part and the UL part of the radio bearer between the first cell and the second cell; and transmit an acknowledgement in response to the handover request, the acknowledgement indicating admission of the splitting.

17. The second network node of claim 16, wherein the handover request indicates handover of only the one of the DL part or the UL part of the radio bearer from the first cell to the second cell, and wherein the acknowledgement indicates admission of handover of only the one of the UL part or the DL part of the radio bearer from the first cell to the second cell.

18. The second network node of claim 17, wherein the control and processing circuit is further operable to:

transmit to a core network node, a path switch request requesting user plane switch of only the one of the DL part or the UL part of the radio bearer from the first cell to the second cell; and receive from the core network node an acknowledgement of the path switch request, the acknowledgement requesting user plane switch of only the one of the DL part or the UL part of the radio bearer from the first cell to the second cell, which acknowledge indicates user plane switch of only the one of the UL or the DL part of the radio bearer from the first cell to the second cell.

19. The second network node of claim 16, wherein the handover request indicates a first handover of both the DL part and the UL part of the radio bearer from the first cell to the second cell and a second handover of only the other of the DL part or the UL part of the radio bearer from the second cell to the first cell, and wherein the control and processing circuit is further operable to:

transmit to a core network node, a path switch request requesting user plane switch for both the DL part and the UL part of the radio bearer in relation to the indicated first handover;

receive from the core network node an acknowledgement of the path switch request, the acknowledgement of the path switch request indicating user plane switch for both the DL part and the UL part of the radio bearer in relation to the indicated first handover;

transmit a second handover request indicating handover of only the other of the UL or the DL part of the radio bearer, from the second cell to the first cell; and receive an acknowledgement of the second handover request, the acknowledgement of the second handover request indicating admission of handover of only the other of the UL part or the DL part of the radio bearer, from the second cell to the first cell.

20. The second network node of claim 16, wherein the second network node is the same network node as the first network node, and is adapted to serve both the first cell and the second cell.

21. A method in a core network node for splitting a downlink (DL) part and an uplink (UL) part of a radio bearer between a first cell and a second cell in a wireless communications network, wherein the radio bearer is associated to DL and UL transmissions between a first network node and a user equipment in a first cell, the method comprising:

receiving a first path switch request indicating user plane switch of both the DL part and the UL part of the radio bearer from the first cell to the second cell;

transmitting an acknowledgement of the first path switch request indicating user plane switch of both the DL part and the UL part of the radio bearer from the first cell to the second cell;

receiving a second path switch request indicating user plane switch of only one of the DL part or the UL part of the radio bearer from the second cell to the first cell; and transmitting an acknowledgement of the second path switch request indicating user plane switch of only the one of the DL part or the UL part of the radio bearer from the second cell to the first cell, wherein the first path switch request and the second path switch request are based on a decision to trigger a user plane switch of only one of the DL part or the UL part of the radio bearer from the first cell to the second cell, rather than allocating almost blank subframes (ABS) in the second cell.

22. A core network node adapted for splitting a downlink (DL) and an uplink (UL) part of a radio bearer between a first cell and a second cell in a wireless communications network, wherein the radio bearer is associated to DL and UL transmissions between a first network node and a user equipment in a first cell, the core network node comprising control and processing circuitry operable to:

receive a first path switch request indicating user plane switch of both the DL part and the UL part of the radio bearer from the first cell to the second cell;

transmit an acknowledgement of the first path switch request indicating user plane switch of both the DL part and the UL part of the radio bearer from the first cell to the second cell;

receive a second path switch request indicating user plane switch of only one of the DL part or the UL part of the radio bearer from the second cell to the first cell; and transmit an acknowledgement of the second path switch request indicating user plane switch of only the one of the DL part or the UL part of the radio bearer from the second cell to the first cell, wherein the first path switch request and the second path switch request are based on a decision to trigger a user plane switch of only one of the DL part or the UL part of the radio bearer from the first cell to the second cell, rather than allocating almost blank subframes (ABS) in the second cell.

* * * * *